(12) United States Patent
Suzuki et al.

(10) Patent No.: US 7,693,507 B2
(45) Date of Patent: Apr. 6, 2010

(54) WIRELESS NETWORK CONTROL DEVICE AND WIRELESS NETWORK CONTROL SYSTEM

(75) Inventors: Hidehiko Suzuki, Kawasaki (JP);
 Yoshihiro Kubota, Kawasaki (JP);
 Tatsuhiro Ando, Kawasaki (JP); Takuji Oyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 891 days.

(21) Appl. No.: 11/394,538

(22) Filed: Mar. 31, 2006

(65) Prior Publication Data

US 2007/0150732 A1 Jun. 28, 2007

(30) Foreign Application Priority Data

Dec. 28, 2005 (JP) .............................. 2005-378195

(51) Int. Cl.
 *H04M 1/66* (2006.01)
(52) U.S. Cl. .................... 455/411; 455/410; 713/168; 726/26; 380/247; 709/223; 370/401; 370/465
(58) Field of Classification Search .................. 455/411
 See application file for complete search history.

(56) References Cited

U.S. PATENT DOCUMENTS

2001/0037466 A1* 11/2001 Fukutake et al. ............ 713/201
2004/0054905 A1* 3/2004 Reader ....................... 713/171
2004/0073793 A1* 4/2004 Takeda ........................ 713/168
2004/0181692 A1* 9/2004 Wild et al. ................... 713/201
2004/0198220 A1* 10/2004 Whelan et al. .............. 455/41.1
2005/0152395 A1* 7/2005 Hales .......................... 370/465
2005/0220099 A1* 10/2005 Igarashi ....................... 370/389
2006/0021001 A1* 1/2006 Giles et al. ...................... 726/1
2007/0002833 A1* 1/2007 Bajic .......................... 370/352
2007/0140181 A1* 6/2007 Channegowda et al. ..... 370/338

FOREIGN PATENT DOCUMENTS

JP 2004-172782 6/2004
JP 2004-179882 6/2004

* cited by examiner

*Primary Examiner*—Rafael Pérez-Gutiérrez
*Assistant Examiner*—German Viana Di Prisco
(74) *Attorney, Agent, or Firm*—Fujitsu Patent Center

(57) ABSTRACT

A wireless LAN control device includes a wireless LAN control unit having a transmitting/receiving unit performing communications with a plurality of wireless LAN access points belonging to different user groups and a wireless LAN connection control unit. The wireless connection control unit executes control of transferring a user authentication request received by the transmitting/receiving unit via one of the plurality of wireless LAN access points and given from a wireless LAN terminal belonging to one of the user groups toward an authentication server that should execute an authentication process in response to the user authentication request, and transmitting an authentication result given from the authentication server in response to the user authentication request to the wireless LAN terminal via one of the plurality of wireless LAN access points.

15 Claims, 17 Drawing Sheets

FIG. 10

USER LIST

| USER ID | PASSWORD |
|---|---|
| xxx@carrier.com | 123 |
| yyy@carrier.com | 456 |
| ... | ... |
| zzz@carrier.com | 789 |

~341

RADIUS PROXY DESTINATION LIST

| FQDN LIST | PROXY DESTINATION AUTHENTICATION SERVER |
|---|---|
| @b.com | AUTHENTICATION SERVER OF ENTERPRISE B |

ACCESS LIST FOR USER GROUP x

ACCESS LIST FOR ENTERPRISE A

| | SOURCE ADDRESS | DESTINATION ADDRESS | TRAFFIC TYPE | ACCESS AUTHORITY |
|---|---|---|---|---|
| (A) | 10.1.x.x. 0.0.0.255 | ALL | ALL | PERMITTED |
| (B) | 10.2.x.x. 0.0.0.255 | 10.y.y.y. 0.0.0.255 | ALL | NON-PERMITTED |
| | 10.2.x.x. 0.0.0.255 | ALL | ALL | PERMITTED |
| (C) | 10.3.x.x. 0.0.0.255 | 10.y.y.y. 0.0.0.255 | SIP/RTP | PERMITTED |
| | 10.3.x.x. 0.0.0.255 | 10.y.y.y. 0.0.0.255 | ALL | NON-PERMITTED |
| | 10.3.x.x. 0.0.0.255 | ALL | ALL | PERMITTED |
| (D) | ALL | ALL | ALL | NON-PERMITTED |

WIRELESS NETWORK CONTROL DEVICE AND WIRELESS NETWORK CONTROL SYSTEM

BACKGROUND OF THE INVENTION

1. Technical Field

The invention relates to user authentication and access control in a wireless access system.

2. Background Art

A device generally called a [wireless LAN switch] is given as a device having a control function of a wireless LAN (Local Area Network) access point and a LAN frame switching function.

FIG. 17 shows an example of an architecture of a communication system to which the wireless LAN switch is applied. In FIG. 17, the wireless LAN switch accommodates a plurality of wireless LAN access points. Further, the wireless LAN switch is connected via a router or a switch to an authentication server (Radius (Remote Authentication Dial-In User Service) server), a DHCP (Dynamic Host Configuration Protocol) server and an SIP (Session Initiation Protocol) server. Further, the wireless LAN switch is connected to the Internet via the router or the switch and equipment of a common carrier.

The wireless LAN switch has a function of managing the plurality of wireless LAN access points. The management function includes a function of managing the authentication of a user trying to connect to a network by use of one of the wireless LAN access points in an integrated fashion. The wireless LAN switch, in the case of receiving a connection request from the user, performs the user authentication in communication linkage with the authentication server. When the user authentication gets successful, the wireless LAN switch leases, from the DHCP server, an IP (Internet Protocol) address that should be used by the user. Once the IP address is assigned to the user, the communications can be performed via the wireless LAN switch. Further, for example, if the user desires to use an IP telephone, the user performs the communications with the SIP server via the wireless LAN switch, thus establishing an IP telephone call on the Internet.

The wireless LAN switch is installed in an enterprise network for the purpose of providing staff members of an enterprise with an access service to the Internet and the Intranet, and manages a plurality of wireless LAN access points installed within the enterprise. The staff member of the enterprise can utilize the Internet and the Intranet via the wireless LAN switch by connecting a wireless LAN terminal to one of the wireless LAN access points.

As described above, the wireless LAN switch is installed for providing the staff members of the enterprise with usage environments of the Internet and the Intranet. Therefore, it is not assumed to provide the usage environments of the Internet and the Intranet with respect to accesses from persons (such as staff members of other enterprises and customers of the enterprises) other than the staff members of the enterprise concerned.

Over the recent years, in the services provided by the common carriers, there have arisen needs for employing the wireless LAN switch. One of the services is a mobile centrex service. In the mobile centrex service, the wireless LAN access points are installed within the enterprise, and extensions are actualized by the wireless IP telephony. One other service is an FMC (Fixed Mobile Convergence) service. The FMC service is a service in which fixed communications are merged with mobile communications. In the FMC service, the wireless LAN is placed as one of access lines, and a network of the common carrier accommodates a wireless LAN in the enterprise, a public wireless LAN and a wireless LAN in a home.

The following technologies described in the following documents are given as the prior arts related to the invention.

[Patent document 1] Japanese Patent Application Laid-Open Publication No. 2004-172782

[Patent document 2] Japanese Patent Application Laid-Open Publication No. 2004-179882

SUMMARY OF THE INVENTION

Disclosure of the Invention

Problems to be Solved by the Invention

In the mobile centrex service and the FMC service, there is considered a first mode of installing the wireless LAN switch in the enterprise. Further, the following second mode is also considered. To be specific, the common carrier has equipment including the wireless LAN switch or a function corresponding to the wireless LAN switch, and the equipment accommodates the plurality of intra-enterprise wireless LANs, the public wireless LAN and the wireless LAN of the home, thereby providing a service for managing these wireless LAN access points.

The system using the wireless LAN switch at the present as shown in FIG. 17 does not, however, assume the second mode. Namely, it is not assumed that the conventional wireless LAN switch accommodates, in parallel, a plurality of user groups (such as user groups of the enterprise, user groups of the public wireless LAN and the user group of the home) having different authentication policies and different lease IP address groups (subnets).

Accordingly, an allocation policy of allocating a user authentication request to a proper authentication server by identifying the user group could not be set in the wireless LAN switch, and a different access control policy could not be set in each user group. In other words, for example, an unspecified wireless LAN switch could not accommodate a plurality of intra-enterprise wireless LANs, the authentication requests from the individual users of the enterprise could not distributed to the authentication servers different for every enterprise, and the wireless LAN system within the enterprise could not be prepared with a free spot, wherein guest users from outside the enterprise access without any restrictions.

It is an object of the invention to provide a technology capable of accommodating, in parallel, wireless networks of a plurality of user groups having different authentication policies etc and providing a proper communication service in response to an access from a user of each of the user groups.

It is another object of the invention to provide a technology enabling users belonging to other user groups to enjoy communication services by use of a wireless base station belonging to a certain user group.

Means for Solving the Problems

The invention adopts the following means in order to solve the problems.

The invention is a wireless network control device comprising:

a communication unit performing communications with a plurality of wireless base stations belonging to different user groups, and a control unit executing control of transferring a user authentication request received by the communication unit via one of the plurality of wireless base stations and given from a wireless terminal belonging to one of the user groups toward an authentication device that should execute an authentication process in response to the user authentication request, and transmitting an authentication result given from the authentication device in response to the user authentication request to the wireless terminal via one of the plurality of wireless base stations.

Further, the invention is a wireless network control system comprising a wireless network control device accommodating a plurality of wireless base stations belonging to different user groups, and a plurality of authentication devices each executing an authentication process in response to a user authentication request given from a wireless terminal of a user belonging to each of the user groups, wherein the wireless network control device, when receiving a user authentication request from the wireless terminal via one of the plurality of wireless base stations, transfers the user authentication request to the authentication device corresponding to the user group to which one of the plurality of wireless base stations belongs, the authentication device receiving the user authentication request from the wireless network control device, if unable to execute an authentication process in response to the user authentication request in the self-device, executes a transfer process of transferring the user authentication request, and the transferred user authentication request reaches the authentication device that should execute the authentication process in response to the user authentication request via at least one of relay devices.

According to the invention, the wireless network control device accommodates the plurality of wireless base stations belong the different user groups, and the user belonging to a certain user group can connect to the network from the wireless base station belonging to other user group.

EFFECTS OF THE INVENTION

According to the invention, it is possible to provide the technology capable of accommodating, in parallel, the wireless networks of the plurality of user groups having the different authentication policies etc and providing the proper communication service in response to the access from the user of each of the user groups.

Further, according to the invention, it is feasible to provide the technology enabling the users belonging to other user groups to enjoy the communication services by use of a wireless base station held by a certain user group.

BRIEF DESCRIPTION OF THE DRAWINGS

FIG. 10 is a diagram showing an example of a data structure of the authentication information DB.

FIG. 14 is a diagram showing an example of a data structure of an access list table stored in a storage unit.

DETAILED DESCRIPTION OF THE PREFERRED EMBODIMENT

Best Mode of Carrying Out the Invention

An embodiment of the invention will hereinafter be described with reference to the drawings. A configuration in the following embodiment is an exemplification, and the invention is not limited to the configuration in the embodiment.

[Outline of Wireless LAN Control Device]

In the following discussion, a device for actualizing a wireless LAN access point control function is called a [wireless LAN control device]. A possible method of actualizing the wireless LAN control device is not only a mode of its being actualized by a dedicated piece of hardware (device) but also a method of actualizing the wireless LAN control device as a function acquired by establishing a communication linkage between a general-purpose server and a switch device. Namely, the function of the [wireless LAN control device] according to the invention may be not only the function of the dedicated device but also the function provided by establishing the communication linkage between the existing devices.

Further, in the following discussion of the embodiment, the wireless LAN is exemplified by way of an example of a wireless technology. The wireless technology applicable to the invention is not, however, limited to the wireless LAN. For example, the invention can be applied to wireless MAN (Metropolitan Area Network) such as WiMAX (Worldwide Interoperability for Microwave Access). In this sense, the invention can be defined as a control device (wireless network control device) of a wireless network including the wireless LAN and the wireless MAN.

Embodiment

<System Architecture>

Figure 1:
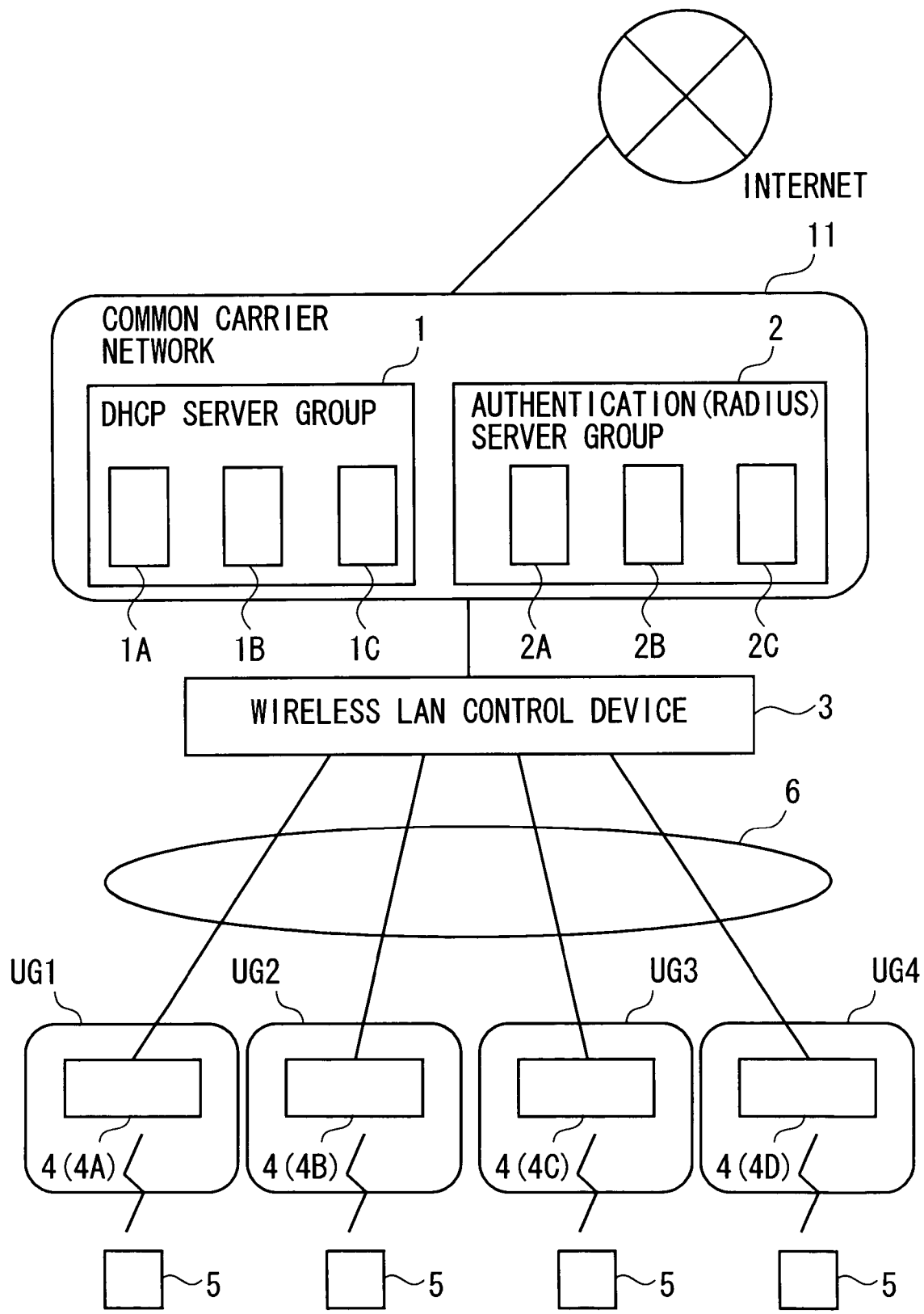
FIG. 1 is a diagram showing a wireless LAN control system.

FIG. 1 is a diagram showing an example of an architecture of a communication system (referred to as a [wireless LAN control system]) to which the wireless LAN control device according to the embodiment of the invention is applied. In the example shown in FIG. 1, the wireless LAN control system is configured as follows.

An authentication server (Radius server) group 2 and a DHCP server group 1 are installed in a common carrier (which might be simply termed [carrier]) network 11. A wireless LAN control device 3 is connected to the carrier network 11. The wireless LAN control device 3 is held by the carrier.

The wireless LAN control device 3 can accommodate a plurality of wireless network base stations (access points) belonging to different user groups. Categories of the user groups include, e.g., [enterprise], [public wireless LAN] and [home]. In other words, the wireless LAN control device 3 can accommodate a plurality of enterprises, a plurality of public wireless LANs and a plurality of homes in mixture.

In the example illustrated in FIG. 1, the wireless LAN control device 3 accommodates enterprises A and B, the public wireless LAN and home networks (user group networks UG1, UG2, UG3, UG4). One or more wireless LAN access points (which will hereinafter be simply referred to as [access points]) are installed in the enterprise A, the enterprise B, the public wireless LAN and the home (each of the user group networks UG1 through UG4) (in FIG. 1, access points 4A, 4B, 4C and 4D are exemplified. The access points will hereinafter be referred to as the [access points 4] unless the access points 4A, 4B, 4C and 4D are specified).

Each access point 4 is logically connected to the wireless LAN control device 3 via an access network 6 to the carrier network 11. The access point 4 can be, however, physically connected also to the wireless LAN control device 3.

The user of the wireless LAN control device 3 is a user of each of the wireless LANs in the enterprises A and B, the public wireless LAN and the home, and belongs to any one of a plurality of user groups consisting of the [enterprise A], the [enterprise B], the [public wireless LAN] and the [home].

The user can connect to the access point 4 of the user group to which the user himself or herself belongs by use of a wireless LAN terminal 5. The wireless LAN terminal 5 can involve applying a wireless-LAN-installed wireless IP telephone, a wireless-LAN-installed PDA (Personal Digital Assistance), a wireless-LAN-installed PC (Personal Computer), etc.

The wireless LAN terminal 5 is connected to the carrier network 11 via the wireless LAN control device 3 by connecting to the access point 4. The wireless LAN terminal 5 is connected to the Internet 7 via the carrier network 11.

Each of users belonging to the enterprise A and the enterprise B establishes the connection via the wireless LAN control device 3 in the case of accessing an Intranet of the self-company.

The authentication server group 2 and the DHCP server group 1, which are installed in the carrier network 11, are composed of a plurality of servers and a plurality of DHCP servers that are installed on a user-group-by-user-group basis. In FIG. 1, the authentication server group 2 is composed of an authentication server 2A for the enterprise A, an authentication server 2B for the enterprise B and an authentication server 2C for the public wireless LAN/home. Further, the DHCP server group 1 is composed of a DHCP server 1A for the enterprise A, a DHCP server 1B for the enterprise Banda DHCP server 1C for the public wireless LAN/home. Each of the DHCP servers is composed of one or more DHCP servers. The authentication server group 2 is provided for authenticating the users of the respective user groups, and the DHCP server group 1 is provided for leasing (address lease) an IP address to the user of the access point 4 of each user group.

The authentication server group 2 and the DHCP server group 1 may be composed of plural server devices prepared on the user-group-by-user-group basis and may also be configured by logically separating the physically the same servers on the user-group-by-user-group basis.

Further, the wireless LAN control device 3, the authentication server group 2 and the DHCP server group 1 have no necessity of being installed in the carrier network 11 but may be placed anywhere on the network system as shown in FIG. 1. Moreover, all of the wireless LAN control device 3, the authentication server group 2 and the DHCP server group 1 has no necessity of being installed in the same place.

The respectively devices illustrated in FIG. 1 will be individually explained.

<<Wireless LAN Terminal>>

The wireless LAN terminal 5 has a wireless LAN function, a client function of IEEE802.1x and a DHCP client function. The wireless LAN terminal 5, in the case of connecting to the Internet and the Intranet via the wireless LAN control device 3, sets a user ID, a password and an ESSID (Extended Service Set Identifier) as parameters contained in an authentication request. The ESSID is a network identifier in the wireless LAN.

<<Wireless LAN Access Point>>

The access point 4 has a wireless LAN function of IEEE802.11a/b/g and an interface function with the wireless LAN control device. The access point 4 relays communications between the wireless LAN terminal 5 and the wireless LAN control device 3.

<<Authentication Server>>

Each of the authentication servers (Radius servers) 2A, 2B, 2C receives, for an authentication process, an authentication request containing the user ID and the password of the wireless LAN terminal 5, which are transmitted via the wireless LAN control device 3, and transmits a result of the authentication process to the wireless LAN terminal 5 via the wireless LAN control device 3. Further, if the authentication server receiving the authentication request is unable to authenticate the user ID contained in the authentication request, this authentication server transfers the authentication request to a different pre-designated authentication server.

Each of the authentication servers 2A, 2B, 2C has a server function of IEEE802.1x and a Radius Proxy function. Through the Radius Proxy function, the authentication server transfers the authentication request according to a Radius Proxy destination list registered in a database within the self-device with respect to the authentication of a user who is not registered in the database within the self-device.

Each of the authentication servers 2A, 2B, 2C can also, together with the authentication, impose a charge on the user managed by the authentication server.

The authentication server (Radius server) installed on the user-group-by-user-group basis executes the IEEE802.1x user authentication. For example, in the case of permitting the access of the user of the enterprise B in the wireless LAN of the enterprise A, after the authentication server of the enterprise A has authenticated the use of the enterprise network to which the user of the enterprise B belongs, the authentication for using the carrier network by the carrier is received. In this case, a proxy connection established between the authentication servers is employed.

<<DHCP Server>>

Each of the DHCP servers 1A, 1B, 1C administers an IP address pool. Each of the DHCP servers 1A, 1B, 1C, when receiving an IP address acquisition request from the wireless LAN terminal 5 via the wireless LAN control device 3, leases an unused IP address in the IP address pool to the wireless LAN terminal 5.

The DHCP servers 1A, 1B, 1C are prepared on the user-group-by-user-group basis. Further, the DHCP servers can be prepared on an ESSID-by-ESSID basis. With this configuration, the DHCP server can lease an IP address of a different subnet according to the ESSID.

<<Wireless LAN Control Device>>

The wireless LAN control device 3 controls the connection between each of access points 4 connected to the wireless LAN control device 3 and the wireless LAN terminal 5. Further, the wireless LAN control device 3 controls the user authentication of the user of the wireless LAN terminal 5 connected to the access point 4. Moreover, the wireless LAN control device 3 controls leasing the IP address to the wireless LAN terminal 5. Still further, the wireless LAN control device 3 controls the user's access to applications etc.

Figure 2:
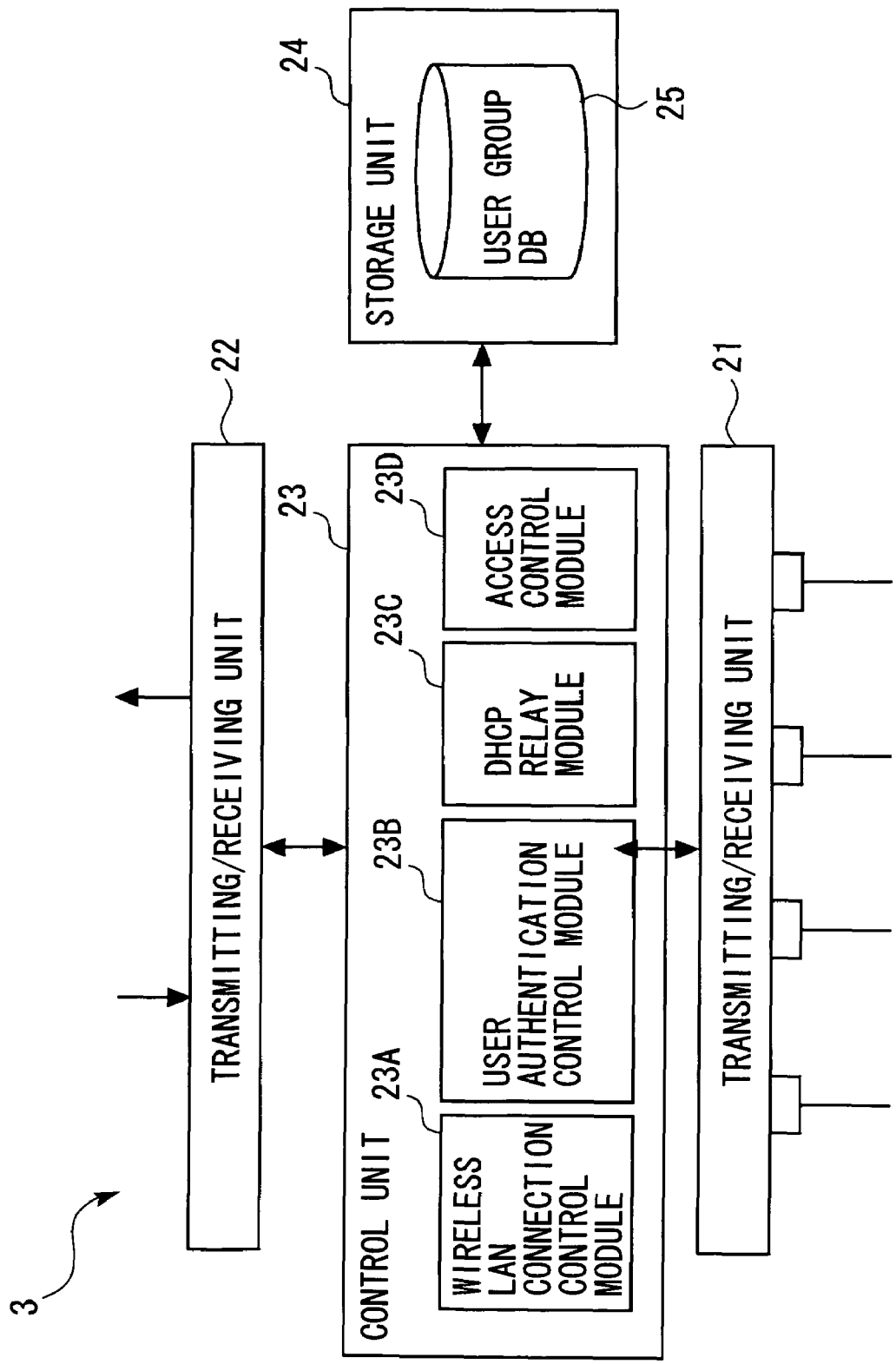
FIG. 2 is a diagram showing wireless LAN control device.

FIG. 2 is a diagram showing an example of a configuration of the wireless LAN control device 3. The wireless LAN control device 3 includes a transmitting/receiving unit 21 on the side of the wireless LAN, a transmitting/receiving unit 22 on the side of the carrier network, a control unit 23, and a storage unit 24. The control unit 23 has a wireless LAN connection control module 23A, a user authentication control module 23B, a DHCP relay module 23C and an access control module 23D. The storage unit 24 is stored with a user group database (user group DB) 25.

The transmitting/receiving unit 21 accommodates each access point 4 via a communication line. The transmitting/receiving unit 22 is connected to the DHCP server group 1 and the authentication server group 2 in the carrier network 11.

The user group DB 25 in the storage unit 24 contains a BSSID (Basic Service Set Identifier) list, a user list (FIG. 5), an ESSID list (FIG. 5) and an access list (FIG. 14). The BSSID list is provided for checking an associated relationship between the BSSID and the user group. The user list is recorded with the user ID and the password that are generated on the user-group-by-user-group basis. The ESSID list is recorded with an associated relationship between the ESSID, the authentication server and the DHCP server. The access list is recorded with an associated relationship between connectability of a source IP address with a destination IP address and usability of a traffic type.

An access point list (AP list (FIG. 5)) can be also used as a substitute for the BSSID list. The AP list is recorded with an associated relationship between a name of the wireless LAN access point belonging to each group and the BSSID thereof on the user-group-by-user-group basis.

The ESSID is assigned on the user-group-by-user-group basis. Further, two or more ESSIDs can be specified within one user group. It is to be noted that the ESSID, it is sufficient, be unique within the user group but may be overlapped between the user groups. The BSSID is one of the network identifiers in the wireless LAN and normally involves using a MAC (Media Access Control) address of the wireless LAN access point.

The control unit 23 is constructed of a CPU, a main memory, an input/output interface, etc, wherein the CPU executes programs recorded on the storage unit 24, thereby actualizing a wireless LAN connection control unit 23A, the user authentication control module 23B, the DHCP relay module 23C and the access control module 23D.

The wireless LAN connection control module 23A controls the connection of the wireless LAN terminal 5 with each of the access points 4. The wireless LAN connection control module 23A receives the ESSID sent from the wireless LAN terminal 5 via the access point 4. Further, the wireless LAN connection control module 23A receives the BSSID sent from the access point 4.

When the BSSID is recorded in the BSSID list, the wireless LAN connection control module 23A refers to the ESSID list of the user group associated with this BSSID. When the ESSID is recorded in the ESSID list, the wireless LAN connection control module 23A notifies the user authentication control module 23B of this ESSID.

If the BSSID is not recorded in the BSSID list, the access point having this BSSID is judged not to have authority of accessing the wireless LAN control device 3. Further, if the ESSID is not recorded in the ESSID list, the wireless LAN terminal 5 transmitting this ESSID is judged not to have authority of establishing the wireless LAN connection via the access point 4. With this contrivance, it is possible to judge whether or not the wireless LAN terminal 5 belongs to the user group utilizable within the wireless LAN area.

The user authentication control module 23B controls the user authentication of the wireless LAN terminal 5 connected to the access point 4. The user authentication control module 23B transfers the authentication request given from the wireless LAN terminal 5 to the authentication server. The user authentication control module 23B refers to the ESSID list in order to determine the transfer destination authentication server. Moreover, the user authentication control module 23B transfers an authentication result given from the authentication server to the wireless LAN terminal 5.

The DHCP relay module 23C transfers an IP address acquisition request given from the wireless LAN terminal 5 to the DHCP server. The DHCP relay module 23C refers to the ESSID list in order to determine the transfer destination DHCP server. Furthermore, the DHCP relay module 23C transfers the IP address transmitted from the DHCP server to the wireless LAN terminal 5. This operation enables the wireless LAN terminal 5 to access the network (such as the Intranet and the Internet).

The access control module 23D judges a connecting destination requested by the wireless LAN terminal 5 and the usability of the application (service) utilized by the wireless LAN terminal. The access list is recorded with a transmission destination, a traffic type and access authority for every source subnet. The access control module 23D refers to the access list and thus judges the usability. Note that the access control can be also done on an IP-address-by-IP-address basis by setting the usability of the application not on the subnet-by-subnet basis but on the IP-address-by-IP-address basis.

It should be noted that the wireless LAN control device 3 corresponds to a [wireless network control device] according to the invention, the wireless LAN access point 4 corresponds to a [wireless base station] according to the invention, the wireless LAN terminal 5 corresponds to a [wireless terminal] according to the invention, the authentication server 2 corresponds to an [authentication device] according to the invention, the DHCP server 1 corresponds to a [leasing device] according to the invention, and the transmitting/receiving unit 21 corresponds to a [communication unit] according to the invention.

<Operational Example>

Figure 3:
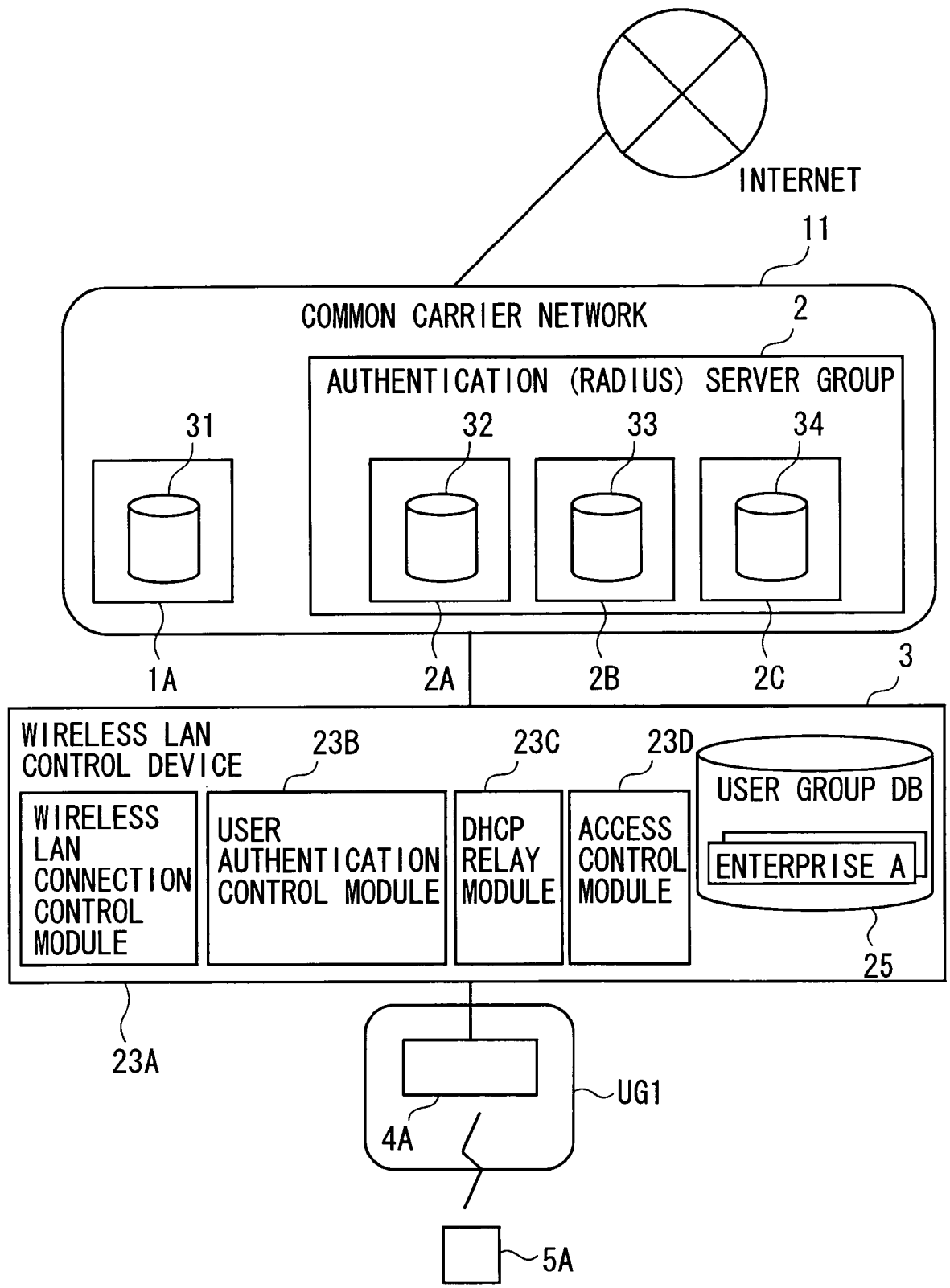
FIG. 3 is an explanatory diagram showing an operational example of the network system shown in FIG. 1.

Next, an operational example in the network system shown in FIG. 1 will be described. FIG. 3 is an explanatory diagram of the operational example in the network system shown in FIG. 1. An operation in such a case that the user of the enterprise B establishes the connection from the access point 4A of the enterprise A by use of the wireless LAN terminal 5, will be explained by way of the operation example.

Figure 4:
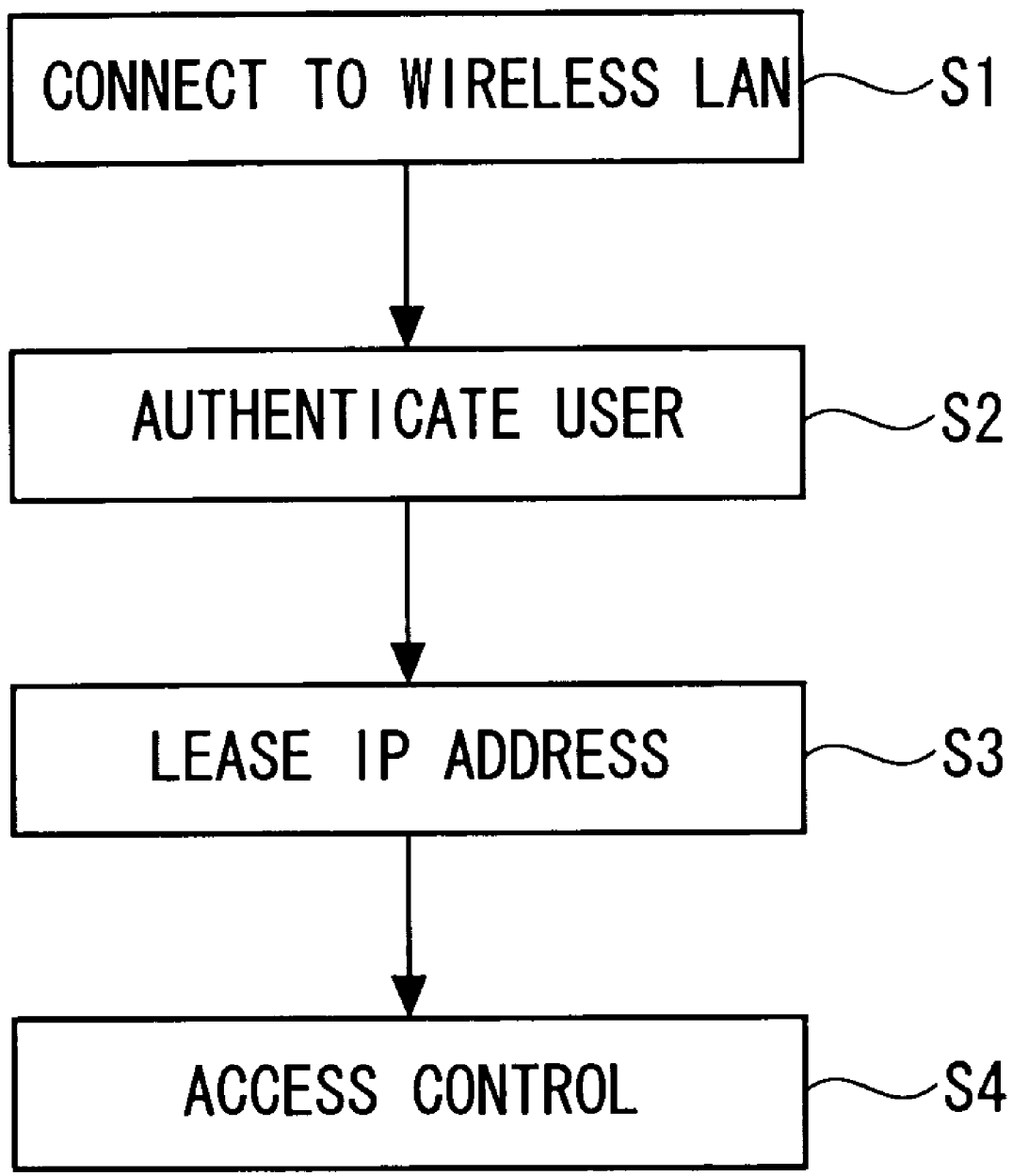
FIG. 4 is a diagram roughly showing an operation flow of the network system in the operational example.

FIG. 4 is a diagram roughly illustrating an operation flow of the network system in the operational example. As shown in FIG. 4, the user of the enterprise B accesses the Internet etc by utilizing the access point 4A, in which case there are executed the connection to the wireless LAN (step S1), the user authentication (step S2), the IP address lease (step S3) and the access control (step S2). Processing contents in respective steps S1 through S4 will be described in full-depth.

<<Connection to Wireless LAN>>

The ESSID can be registered on the user-group-by-user-group basis in the wireless LAN control device 3, and two or more ESSIDs can be registered for one user group. The enterprise A previously registers the ESSID for the user of the enterprise A and the ESSIDs for guests (users not belonging to the enterprise A) in the user group DB 25 of the wireless LAN control device 3.

In the operational example, a certain user group (enterprise A) sets three ESSIDs in the wireless LAN control device 3. Each user group can, however, set a user authentication policy more minutely by setting four or more ESSIDs in the wireless LAN control device 3.

Figure 5:
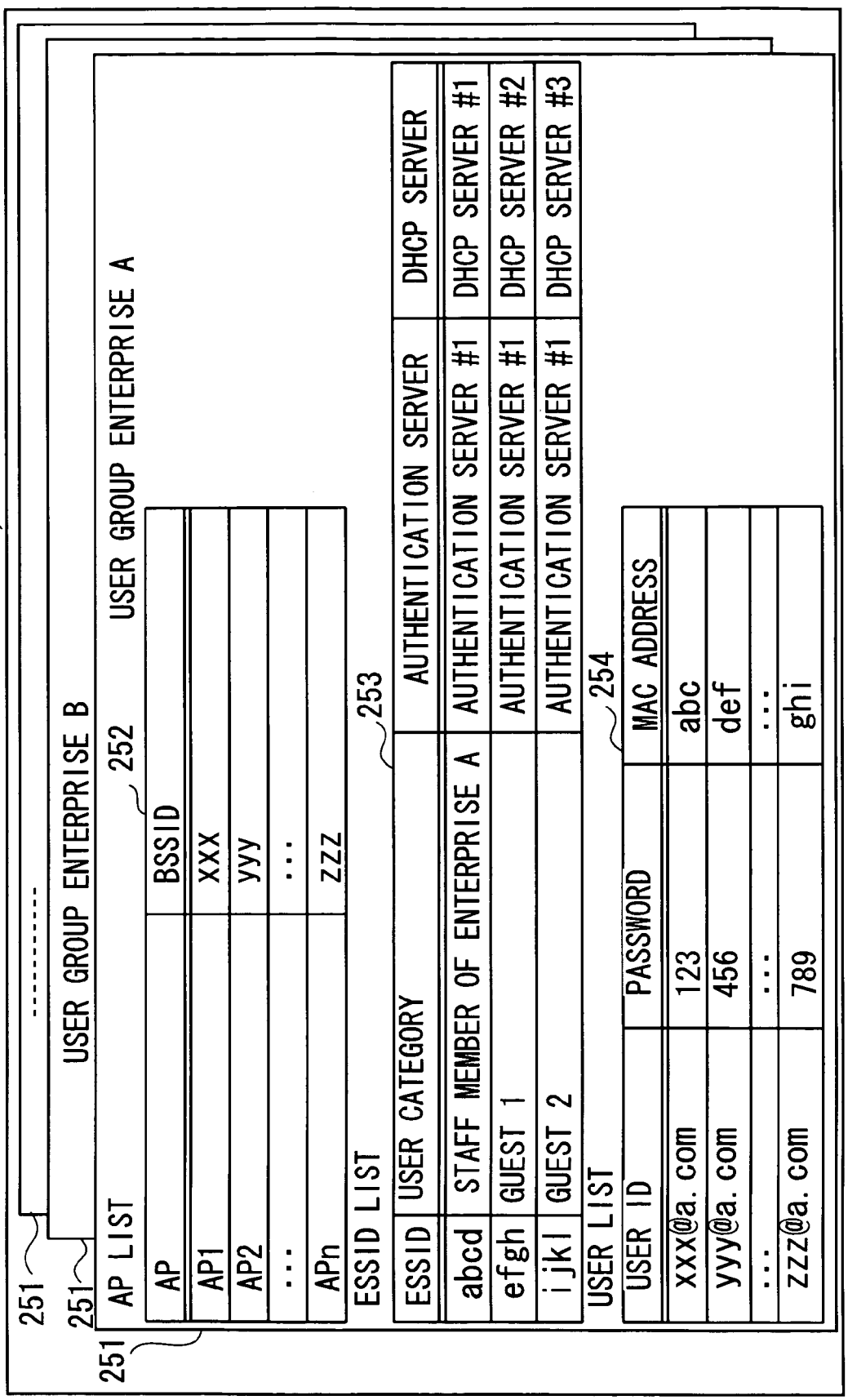
FIG. 5 is a diagram showing an example of a data structure of a user group DB.

FIG. 5 is a diagram showing an example of a data structure of the user group DB 25. As shown in FIG. 5, the user group DB 25 contains a plurality of user group tables 251 prepared on the user-group-by-user-group basis. The user group table 251 is searched by use of the BSSID. Each of the user group tables 251 contains an AP list 252, an ESSID list 253 and a user list 254.

The AP list 252 is registered with a name of the access point 4 held by the user group and with the BSSID. The ESSID list 253 is structured to be registered with one more records each consisting of a user type associated with the ESSID prepared by the user group, an identifier (e.g., an IP address) of the authentication server and an identifier (e.g., an IP address) of the DHCP server.

The user list 254 is registered with a user ID and a password of the user belonging to the user group, and with a MAC address of the wireless LAN terminal employed by the user.

Note that a BSSID list recorded with an associated relationship between the user group and the BSSID may also be held in place of the AP list 251.

The user of the enterprise B, in the case of using the access point 4A, sets an ESSID for a guest, which is prepared by the enterprise A, in the self wireless LAN terminal 5A. When the user of the enterprise B enters the wireless LAN area of the access point 4A, the wireless LAN terminal 5A connects to the access point 4A and sends the authentication request to the access point 4A. The authentication request contains the user ID, the password, the MAC address of the wireless LAN terminal 5A and the ESSID for the guest.

The access point 4A, when receiving the authentication request from the wireless LAN terminal 5A, transfers this authentication request to the wireless LAN control device 3. At this time, the access point 4A sends the BSSID (MAC address) of the access point 4A together with the authentication request.

When the transmitting/receiving unit 21 of the wireless LAN control device 3 receives the authentication request and the BSSID from the access point 4A, the authentication request and the BSSID are given to the wireless LAN connection control module 23A. Hereupon, the wireless LAN connection control module 23A starts a wireless LAN connection control process.

Figure 6:
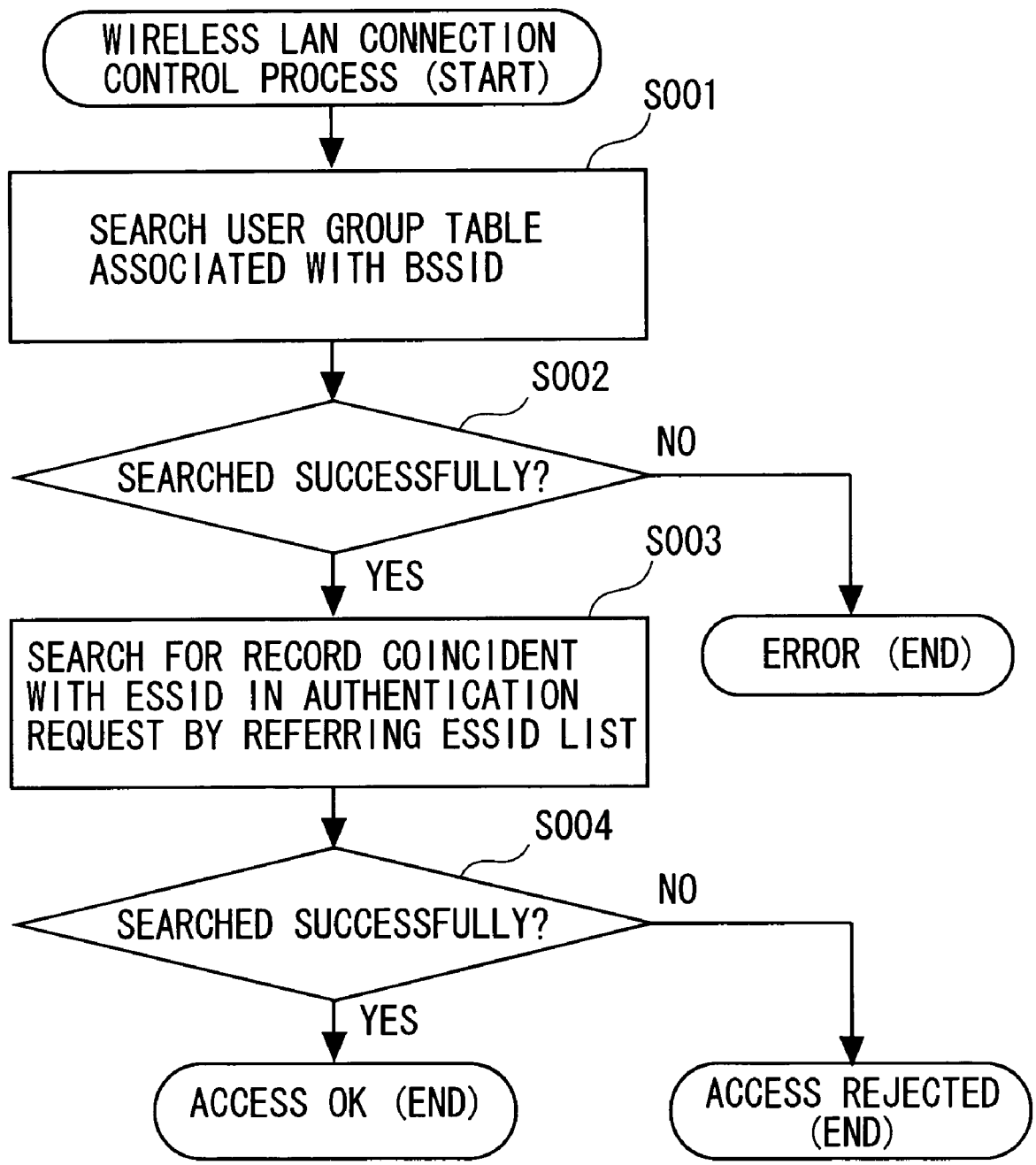
FIG. 6 is a flowchart showing an example of a wireless LAN connection control process.

FIG. 6 is a flowchart showing an example of the wireless LAN connection control process. The wireless LAN connection control module 23A searches for the user group table 251 associated with the BSSID from the user group DB 25 (step S001). To be specific, the wireless LAN connection control module 23A searches for the user group table 251 having the AP list 252 registered with the received BSSID. If none of the corresponding user group table 251 is searched for (step S002; NO), on the assumption that the access point 4A having this BSSID is not registered in the wireless LAN control device 3, the wireless LAN connection control process ends up with an error.

When having searched for the user group table 251 (step S002; YES), the wireless LAN connection control module 23A refers to the ESSID list 253 in the user group table 251 and thus searches for a record coincident with the ESSID contained in the authentication request (step S003).

If there is none of the record coincident with the ESSID (step S004; NO), the wireless LAN connection control module 23A determines to reject the access of the wireless LAN terminal 5A, and finishes the process. With this contrivance, the wireless LAN control device can reject the connection from the user who does not know the ESSID for the guest. In this case, a scheme can be set so that an access reject message is sent to the wireless LAN terminal 5A.

Whereas if the record coincident with the ESSID is searched for (step S004; YES), the wireless LAN connection control module 23A determines to permit the access of the wireless LAN terminal 5A, and finishes the process. At this time, the wireless LAN connection control module 23A notifies the user authentication control module 23B of the identifier of the authentication serve and the authentication request that are contained in the retrieved record.

When the wireless LAN connection control process is executed with respect to the operational example, there are retrieved the user group table 251 of the enterprise A that is associated with the BSSID of the access point 4A, and also retrieved a record associated with the ESSID for the guest from the ESSID list in the user group table 251. The authentication server (an authentication server #1, i.e. the authentication server 2A) associated with the guest ESSID is specified from the record.

<<User Authentication>>

Upon a normal end of the wireless LAN connection control process (upon confirming the registration of the ESSID), a user authentication control process is subsequently executed by the user authentication control module 23B. The user authentication control module 23B starts the user authentication control process, which is triggered by receiving, e.g., the authentication request and the authentication server identifier from the wireless LAN connection control module 23A.

Figure 7:
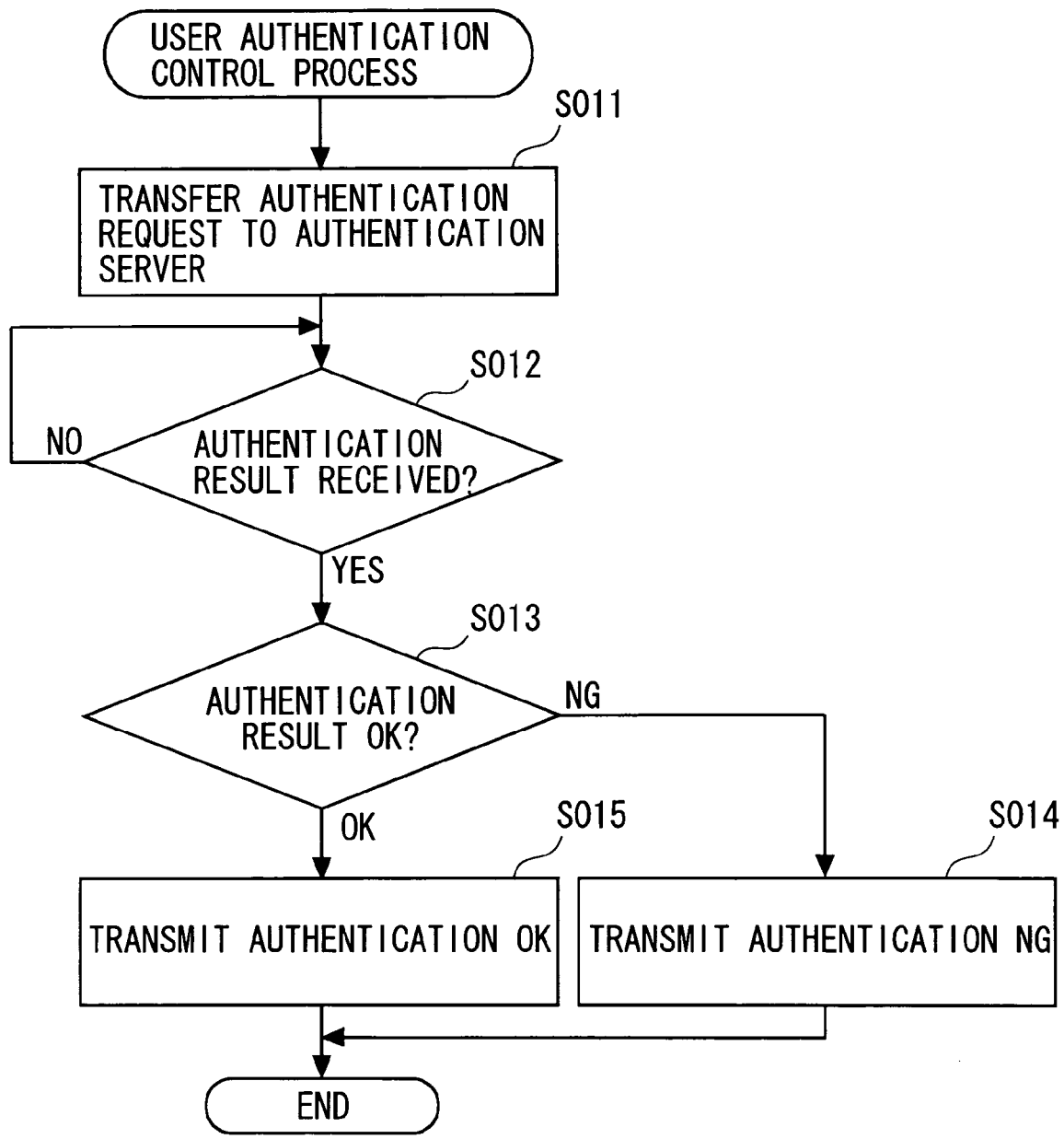
FIG. 7 is a flowchart showing an example of a user authentication control process.

FIG. 7 is a flowchart showing an example of the user authentication control process. In FIG. 7, the user authentication control module 23B transfers the authentication request to the corresponding authentication server on the basis of the authentication server identifier (step S011).

Next, the user authentication control module 23B comes to a standby status for a response (an authentication result) to the authentication request (step S012). Thereafter, the user authentication control module 23B, when receiving the authentication result, judges whether the authentication result is a success (OK) or a failure (NG) (step S013). If the authentication result is NG (S013; NG) the user authentication control module 23B sends this authentication result (NG) to the wireless LAN terminal, and finishes the process. Thereafter, the wireless LAN control device 3 comes to a status of rejecting the access from the wireless LAN terminal.

Whereas if the authentication result is OK (S013; YES), the user authentication control module 23B sends the authentication result (authentication OK) to the wireless LAN terminal 5 (step S015), and finishes the process.

In the operational example, through the process in step S011 in the user authentication control process, the authentication request from the wireless LAN terminal 5 is transferred to the authentication server 2A of the enterprise A. The authentication server 2A, upon receiving the authentication request, if this authentication request is such a request that the authentication process should be executed by the authentication server 2A, executes the authentication process and, if the authentication request is such a request that the authentication process should be executed by an authentication server different from the authentication server 2A, transfers the authentication request to this different authentication server.

Figure 8:
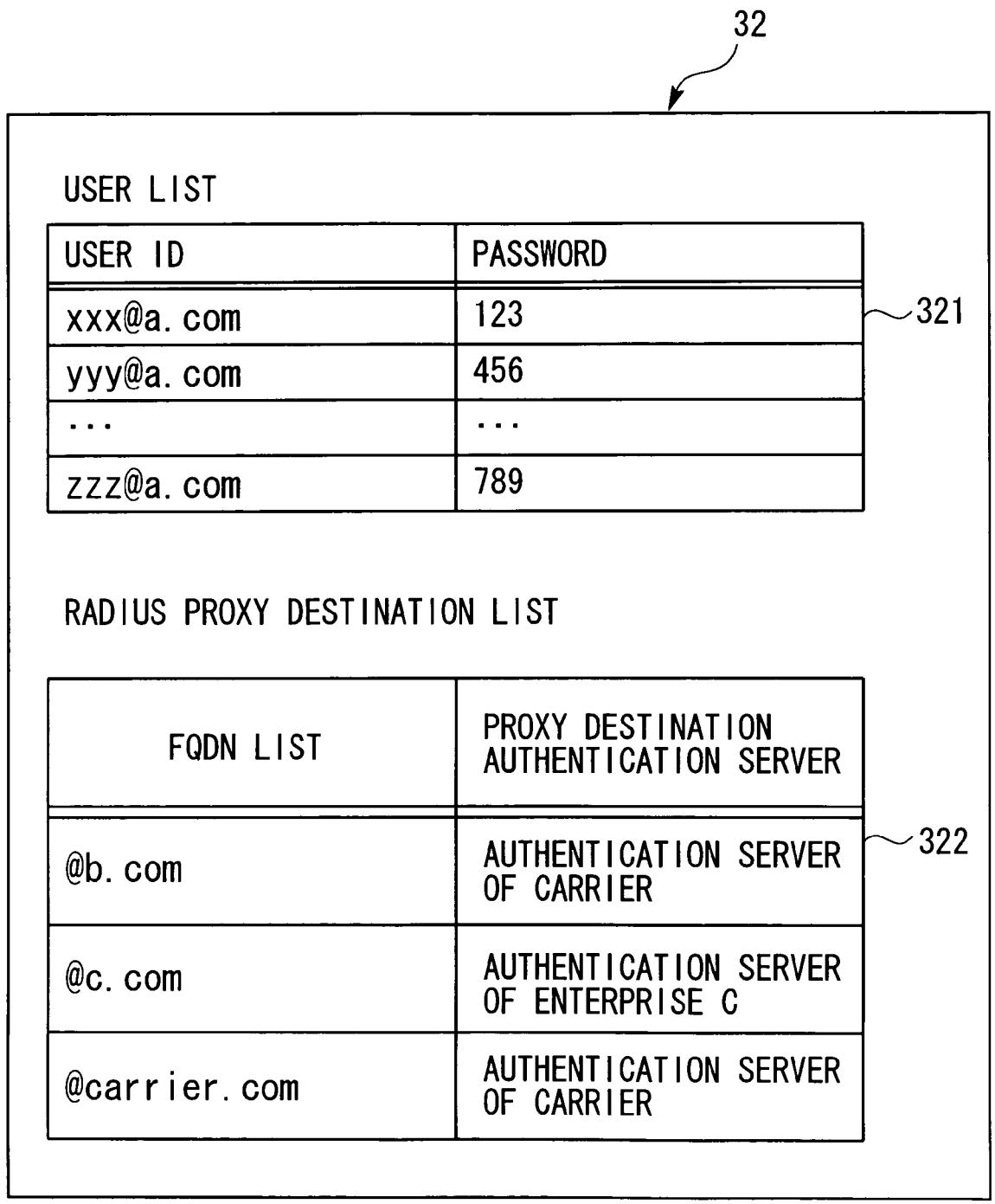
FIG. 8 is a diagram showing an example of a data structure of an authentication information DB.

As shown in FIG. 3, the authentication server 2A has an authentication information database (authentication information DB) 32 of the enterprise A that is stored in the storage device. FIG. 8 is a diagram showing an example of a data structure of the authentication information DB 32.

As illustrated in FIG. 8, the authentication information DB 32 contains a user list 321 and a Radius proxy destination list (authentication proxy destination list) 322. The user list 321 is registered with the authentication information (the user ID and the password) of the user of the enterprise A. The authentication proxy destination list 322 is registered with a FQDN list (a domain name) and an identifier of the proxy destination authentication server.

Note that the authentication server of a certain user group (e.g., the enterprise A) authenticates the user of the self user group but does not authenticate the user of one other user group (e.g., the enterprise B). In this case, the authentication information DB 32 has no necessity of being recorded with the user ID and the password of the user belonging to one other user group.

Figure 9:
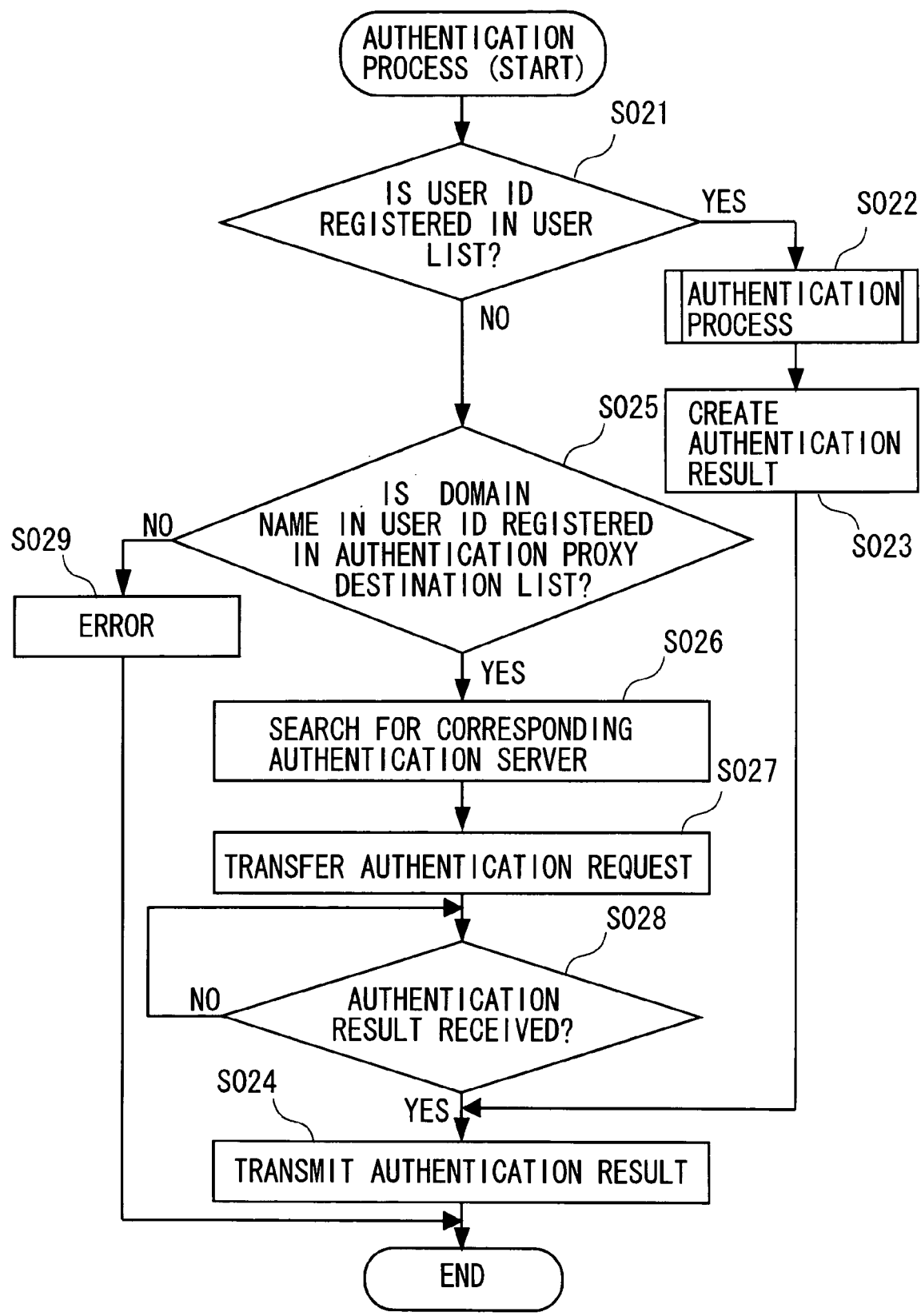
FIG. 9 is a diagram showing an example of the authentication process by an authentication server.

FIG. 9 is a flowchart showing an example of the authentication process by the authentication server. The CPU of the authentication server executes the program, thereby executing this authentication process. A start of the authentication process is triggered by the authentication server's receiving the authentication request.

In FIG. 9, (the CPU of) the authentication server judges whether the user ID contained in the authentication request is registered in the user list 321 or not (S021). If the user ID is registered (S021; YES), the authentication server executes the authentication process (step S022).

Namely, the authentication server judges whether or not the user ID and the password in the authentication request are registered in the user list 321 (FIG. 8). If the user ID and the password are registered, the authentication result is the success (OK), and, whereas if not, the authentication result is the failure (NG).

The authentication server creates the authentication result (OK or NG) (step S023) and transmits the result to the wireless LAN control device 3 (step S024). Upon finishing the transmission, the authentication process comes to an end.

By contrast, if the user ID is not registered in the user list (S021; NO), the authentication server refers to the authentication proxy destination list 322 (FIG. 8), and thus judges whether or not a domain name contained in the user ID in the authentication request is registered in the authentication proxy destination list 322 (step S025).

A this time, if the domain name is not registered (S025; NO), on the assumption that there exists none of the authentication server executing the authentication process in response to the authentication request, an error process (step S029) is executed, and the authentication process is terminated.

By contrast, if the domain name is registered (S025; YES), the authentication server searches the list 322 for an identifier (e.g., an IP address) of the authentication server (the proxy destination authentication server) associated with the registered domain name (step S026).

The authentication server, when having searched for the identifier of the proxy destination authentication server, transfers, based on this identifier, the authentication request to the proxy destination authentication server (step S027). Thereafter, the authentication server comes to the standby status for receiving the authentication result from the proxy destination authentication server (step S028). The authentication server, when receiving the authentication result (S028; YES), sends this authentication result to the wireless LAN control device 3 (S024), and finishes the process.

In a case where the authentication process is executed by the authentication server 2A of the enterprise A, the authentication server 2A confirms that the user ID (for example, xxx@b.com) in the authentication request signal is identical with the user ID in the user group different from the enterprise A. To be specific, the authentication server 2A is unable to detect the user ID from the user list 321 (S021; NO). With this scheme, it is recognized that the user ID specifies the user in the user group other than the enterprise A.

The authentication server 2A of the enterprise A can not authenticate the users other the users of the enterprise A. Such being the case, the authentication server 2A transfers this authentication request to the authentication server 2A of the carrier in accordance with the Radius proxy destination list 322 (S025, S026, S027). If not registered in the authentication proxy destination list, the authentication request is rejected at this point of time (S029).

The authentication server 2C of the carrier (which is also the authentication server for the public wireless LAN/home), when receiving the authentication request, executes the authentication process shown in FIG. 9. The authentication server 2C has an authentication information DB 34 stored in the storage device. The authentication information DB 34 has the same data structure as the authentication information DB 32 shown in FIG. 8 has (see FIG. 10).

In the authentication process (FIG. 9), (the CPU of) the authentication server 2C can not detect the user ID contained in the authentication request from the user list 341 (FIG. 10) (S021; NO) and therefore acquires an identifier of the authentication server of the enterprise B from the authentication proxy destination list 342 (FIG. 10) (S025, S026).

With this operation, the authentication server 2C judges that user as the authentication requester is the user of the enterprise B, and transfers the authentication request further to the authentication server 2B of the enterprise B.

The authentication server 2B, when receiving the authentication request, executes the authentication process shown in FIG. 9. The authentication server 2B has an authentication information DB 33 stored in the storage device. The authentication information DB 33 has, though not illustrated, the same data structure as the authentication information DB 32 shown in FIG. 8 has.

In the authentication process (FIG. 9), (the CPU of) the authentication server 2B detects the user ID contained in the authentication request from the authentication information DB 33 (S021; YES). Then, the authentication server 2B executes the authentication process by use of the user list (S022), and creates an authentication result (authentication OK) (S023). The authentication server 2B sends, based on the source IP address of the authentication request, the authentication result to the authentication server (which is herein the authentication server 2C) as the sender of the authentication request (S024).

The authentication server 2C, when receiving from the authentication server 2B, resumes the authentication process (FIG. 9) (S028; YES), and transfers the authentication result to the authentication server 2A (S024). The authentication server 2A, upon receiving the authentication result from the authentication server 2C (S028; YES), transfers the authentication result to the wireless LAN control device 3 (S024).

When the transmitting/receiving unit 22 of the wireless LAN control device 3 receives the authentication result from the authentication server 2A, the user authentication control module 23B resumes the user authentication control process (S012 in FIG. 7; YES), and sends the authentication result (OK) to the wireless LAN terminal 5A from the transmitting/receiving unit 21 (S013, S015).

As described above, in the embodiment, the authentication server is prepared on the group-user-by-group-user basis, and, if the authentication server receiving the authentication request from the wireless LAN control device 3 is unable to execute the authentication process in response to the authentication request in the self-device, the authentication request is transferred to the proxy destination authentication server. The authentication request finally reaches the authentication server capable of executing the authentication process, wherein the authentication process is executed. The authentication result is transferred back along the transfer route of the authentication request, and finally arrives at the wireless LAN control device 3.

According to such a configuration, the enterprise A can manage the authentication information of the enterprise A, and the enterprise B can manage the authentication information of the user of the enterprise B. Further, with the configuration given above, the common carrier (carrier) acts as go-between for the enterprise A and the enterprise B. With this scheme, the authentication information is not required to be transmitted and received directly between the authentication servers of the enterprise A and the enterprise B. Namely, unlike the case of transmitting and receiving the authentication request directly between the authentication servers, the IP address of the authentication server is not recognizable from the source IP address of the authentication request (the source IP address of the authentication request becomes the IP address of the carrier authentication server). Further, the authentication server of the enterprise A can not know the IP address of the authentication server of the enterprise B. This scheme restrains level-down of the security for the authentication server.

Moreover, as a substitute for the configuration described above, the authentication server of the carrier may, as a proxy, manage the authentication information of the enterprise B. Namely, the authentication server 2C can manage the authentication information DB of the enterprise B within the authentication server 2B. In this case, the authentication request from the user of the enterprise B is, without being transferred to the authentication server 2B of the enterprise B, transferred to the authentication server 2C of the carrier and is authenticated by the authentication server 2C. Further, an authentication server of a third party can, as a proxy for the authentication server 2C of the carrier, execute the authentication process of a certain user group.

Figure 11:
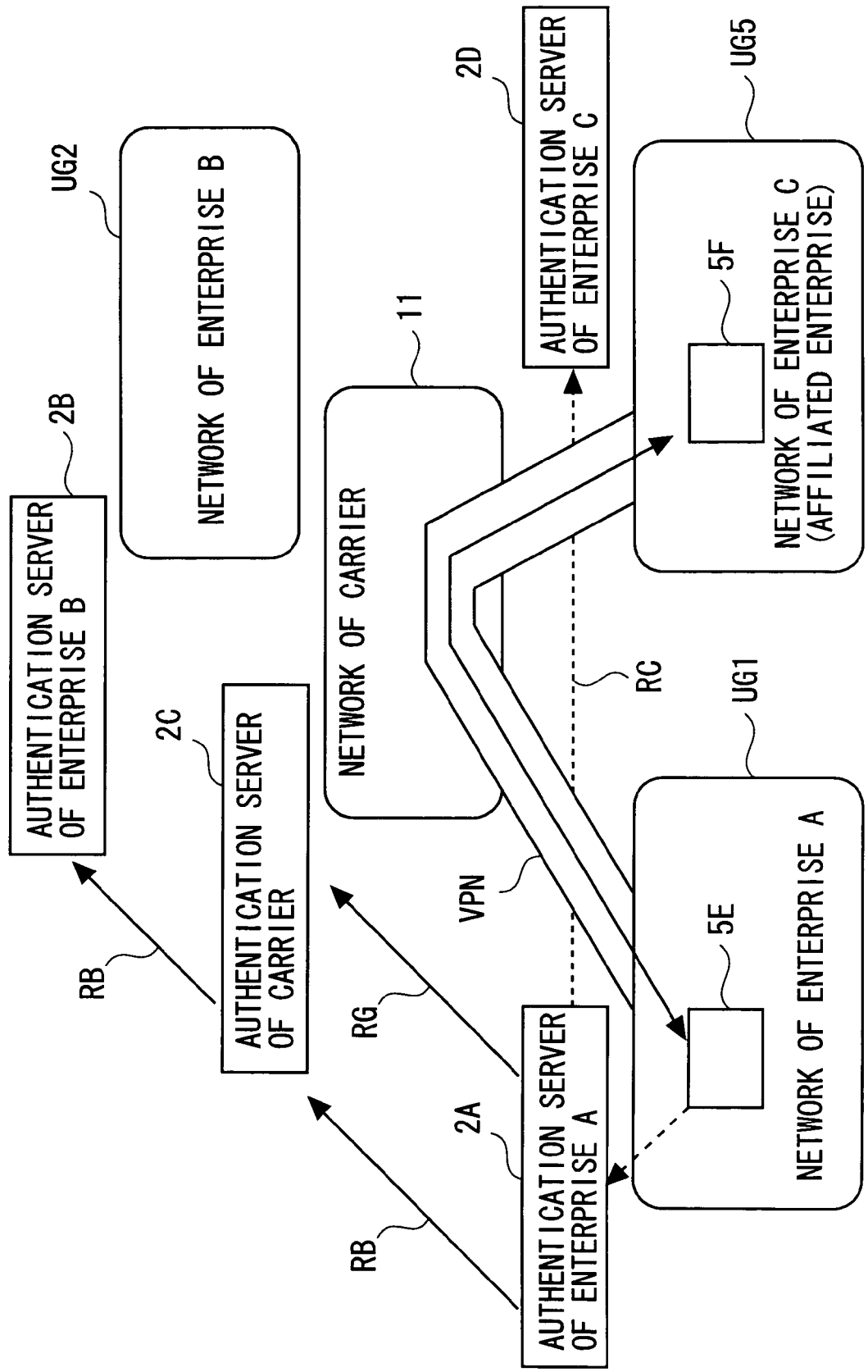
FIG. 11 is a diagram exemplifying a relationship between the authentication server and a proxy destination of the authentication request.

FIG. 11 is a diagram exemplifying a relationship between the authentication server and the proxy destination of the authentication request. In FIG. 11, the authentication request of the wireless LAN terminal 5E connected to the access point 4 (unillustrated) in the network (user group network) UG1 of the enterprise A, is transferred to the authentication server 2A of the enterprise A via the wireless LAN control device 3 (not shown). At this time, if the authentication request is an authentication request RB of the user of the enterprise B, the authentication request RB reaches the authentication server 2B of the enterprise B via the authentication server 2C of the carrier, and the authentication process is executed by the authentication server 2B.

In contrast, the authentication request received by the authentication server 2A is an authentication request RG of the user of the public wireless LAN/home, the authentication request RG is transferred to the authentication server 2C, wherein the authentication process is executed. A premise is herein that the users belonging to the [public wireless LAN] and the [home] are subscribers of the carrier service. Therefore, the user authentication in these user groups is executed by the authentication server 2C.

Further, as shown in FIG. 11, for instance, if the enterprise C is an affiliated enterprise to the enterprise A and if both of the enterprises have a close relationship, the following configuration can be adopted. To be specific, a direct connection between the authentication server 2A of the enterprise A and the authentication server 2D of the enterprise D (between the network UG1 of the enterprise A and the network (user group network) UG5 of the enterprise C), is established by VPN (Virtual Private Network). An authentication request RC of the user of the enterprise C, which is received by the authentication server 2A from the terminal 5E, is transferred to the authentication server 2D in a way that passes through a VPN tunnel, and the authentication process for the authentication request RC is executed by the authentication server 2D. Thereafter, for example, the VPN-based communications can be performed between the terminal 5E and the terminal 5F connected to the access point 4 (unillustrated) within the network UG5.

<<IP Address Lease (Leasing)>>

The wireless LAN terminal 5A receiving the authentication result (OK) from the wireless LAN control device 3 sends next an IP address acquisition request (DHCP request) by use of DHCP. The IP address acquisition request contains the ESSID for the guest. The IP address acquisition request is received by the transmitting/receiving unit 21 of the wireless LAN control device 3 via the access point 4A (at this time, the acquisition request is assigned the BSSID) and is transferred to the DHCP relay module 23C.

The wireless LAN control device refers to the data recorded within the self-device and thus determines the DHCP server to which the IP address acquisition request should be transferred. The request-should-be-transferred DHCP server is determined from the user group to which the wireless LAN access point receiving the authentication request and from the ESSID.

Figure 12:
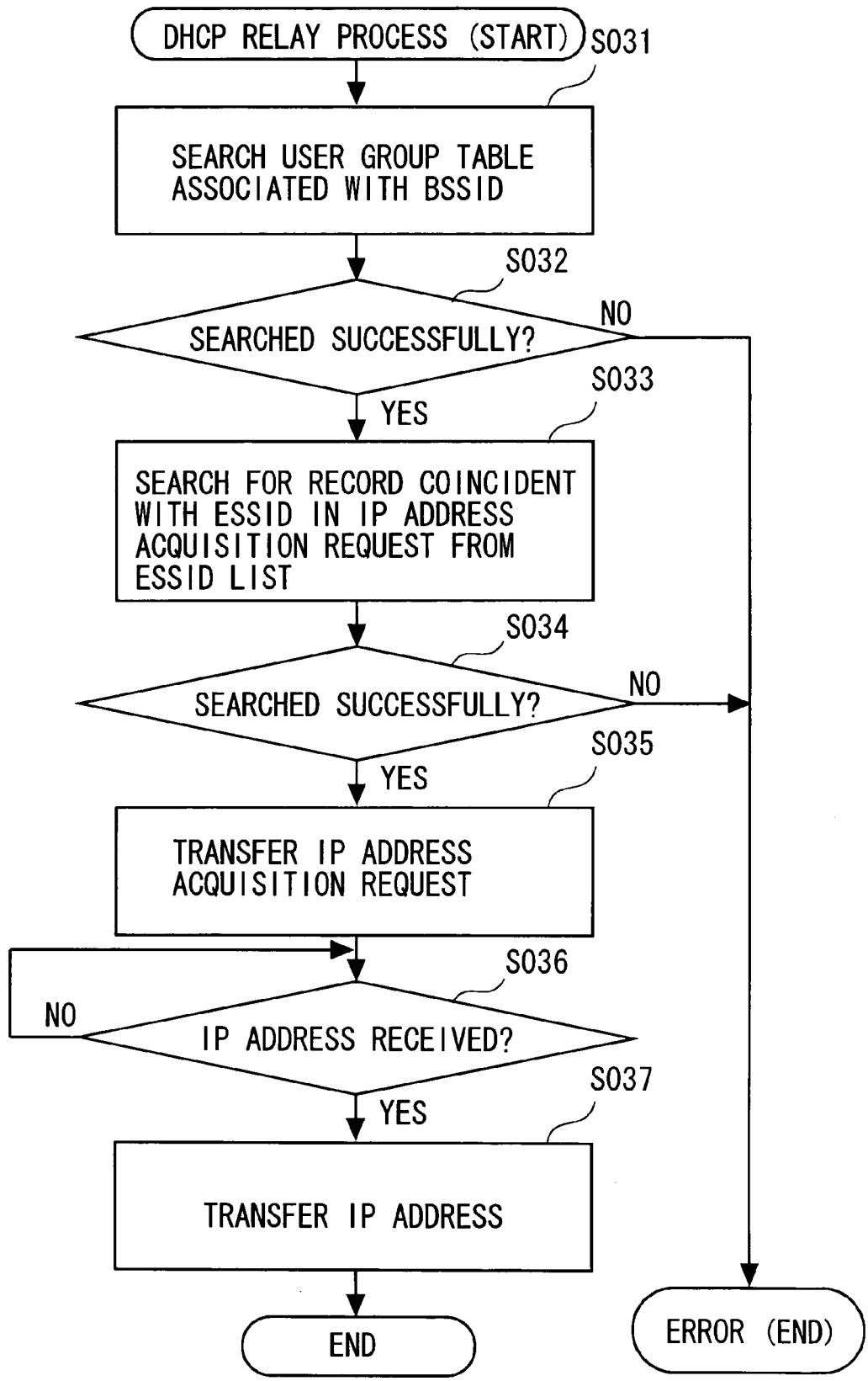
FIG. 12 is a flowchart showing a process by a DHCP relay unit.

FIG. 12 is a flowchart showing a process (DHCP relay process) by the DHCP relay module 23C. A start of the process shown in FIG. 12 is triggered by, for instance, receiving the IP address acquisition request and the BSSID. The DHCP relay module 23C searches for the user group table 251 associated with the BSSID from the user group DB 25 (step S031).

If unable to search for the user group table 251 (step S032; NO), the DHCP relay module 23C, after the error process, finishes the DHCP relay process. Whereas if able to search for the user group table 251 (S032; YES), the DHCP relay module 23C searches for a record coincident with the ESSID contained in the IP address acquisition request from the ESSID list 253 of the user group table 251 (step S033).

If none of such a record is retrieved (step S034; NO), after the error process, the DHCP relay process is terminated. Whereas if the record is searched for (S034; YES), the DHCP relay module 23C transfers, based on a DHCP server identifier (e.g., an IP address) registered in the record, the IP address acquisition request to the DHCP server from the transmitting/receiving unit 22 (step S035).

Thereafter, the DHC relay unit 23C comes to the standby status for receiving the IP address from the DHCP server (step S036). When the IP address is received by the transmitting/receiving unit 22 (S036; YES), the DHCP relay module 23C transmits the IP address to the wireless LAN terminal 5A from the transmitting/receiving unit 21 (step S037). Thereafter, the DHCP relay process is terminated.

In the operational example, the DHCP relay module 23C retrieves the user group table 251 of the enterprise A on the basis of the BSSID of the access point 4A of the enterprise A (S031, S032; YES). Next, the DHCP relay module 23C acquires an identifier of the DHCP server (which is a DHCP server #2, i.e., a DHCP server 1AB (FIG. 13)) associated with the ESSID contained in the IP address acquisition request from the ESSID list of the retrieved user group table 251 (S033, S034; YES). The DHCP relay module 23C transfers the IP address acquisition request to the DHCP server 1AB (S035).

The DHCP server 1AB manages, in the IP address pool 31, a plurality of IP addresses leasable in response to a request from a DHCP client. The IP address pool 31 is generated on the storage device of the DHCP server 1AB.

(The CPU of) the DHCP server 1AB receiving the IP address acquisition request from the wireless LAN control device 3 extracts unused IP addresses from the IP address pool 31 and sends these unused IP addresses to the wireless LAN control device 3.

The IP address leased from the DHCP server 1AB is received by the transmitting/receiving unit 22 of the wireless LAN control device 3. Then, the DHCP relay module 23C resumes the DHCP relay process (S036; YES), and the IP address is transmitted from the transmitting/receiving unit 21 (S037). The IP address is received by the wireless LAN terminal 5A via the access point 4A. The wireless LAN terminal 5A registers the notified IP address in the self-device and uses this IP address as an address for the IP-based communications.

Figure 13:
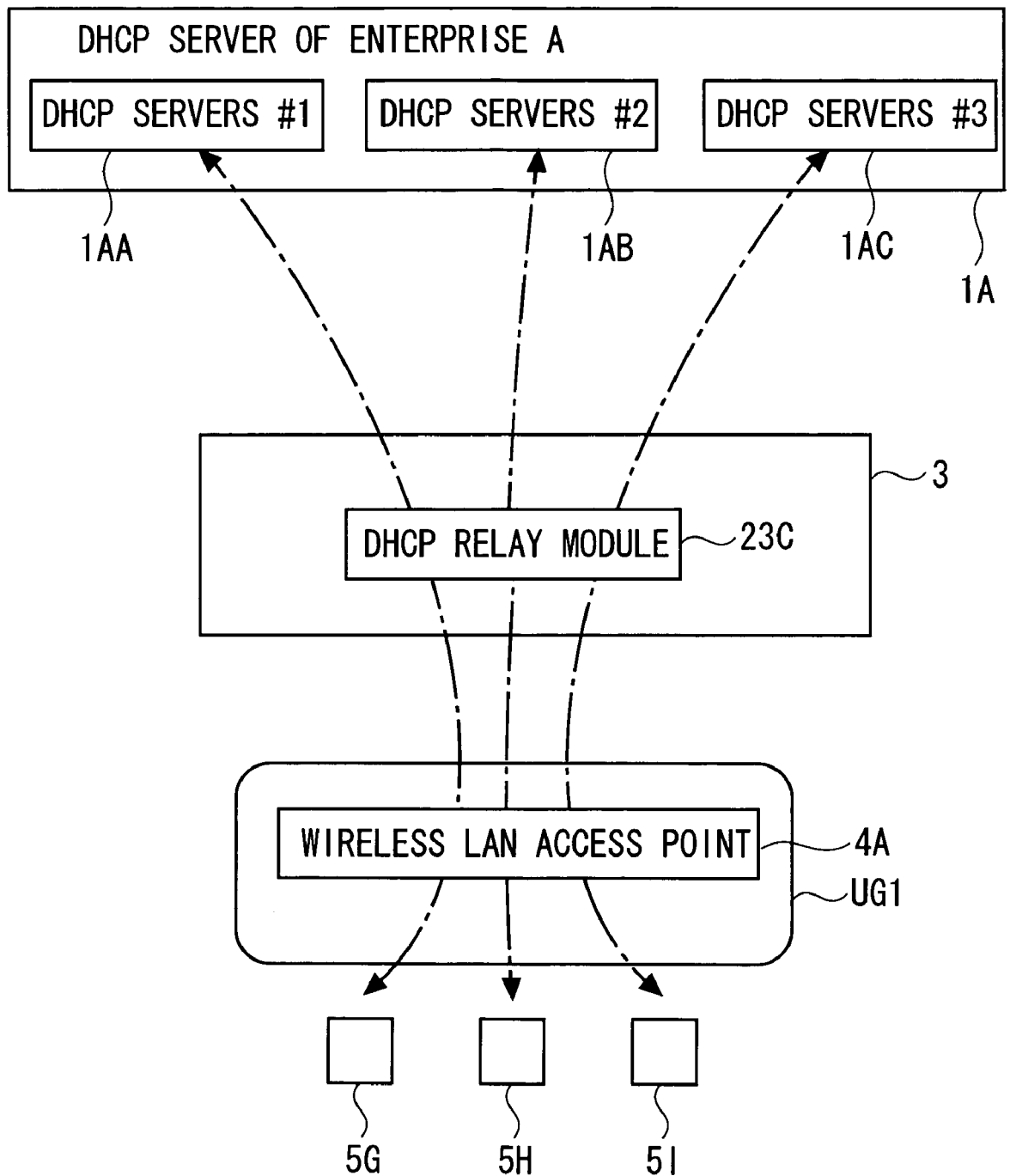
FIG. 13 is an explanatory diagram of an operation of leasing an IP address that is applied to an operational example.

FIG. 13 is an explanatory diagram of the operation of leasing the IP address, which is applied to the operational example. In FIG. 13, the DHCP relay module 23C of the wireless LAN control device 3 receives the IP address acquisition requests from the wireless LAN terminals 5G, 5H, 5I from the respective user groups (the enterprise A, the enterprise B and the home), which are received from the access point 4A within a certain user group network (exemplified by the network UG1 of the enterprise A in FIG. 13).

Then, the DHCP relay module 23C allocates the IP address acquisition requests respectively to the plurality of DHCP servers on the basis of the user groups (which can be specified from the BSSIDs) to which the access point 4A utilized by the wireless LAN terminals 5G, 5H, 5I belong and on the basis of the ESSIDs (the ESSIDs different according to the user type are defined) specified in the user groups.

For instance, the DHCP relay module 23C allocates the IP address acquisition request from the wireless LAN terminal 5G (the enterprise A) to a DHCP server 1AA for the user of the enterprise A, the IP address acquisition request from the wireless LAN terminal 5H (the enterprise B) to a DHCP server 1AB for the user of the enterprise B, and the IP address acquisition request from the wireless LAN terminal 5I (the home) to a DHCP server 1AC for the user of the home. With such a configuration applied, it is feasible to lease the IP addresses of the subnets different on the user-group-by-user-group basis and on the ESSID-by-ESSID basis. For example, the IP addresses of the subnets different from each other can be leased to the staff members utilizing the access point of the enterprise A and to the guest users. Note that the IP addresses of the subnets different for every application can be also utilized by allocating the ESSIDs for every application to be used.

It should be noted that the DHCP server to which the IP address acquisition request is allocated may be installed as a physically separated DHCP server, and the address pool may be managed according to every logical DHCP server in a way that logically separates the physically same server.

<<Access Control>>

At a point of time when completing the IP address lease, the wireless LAN terminal 5A comes to an IP-based communication enabled status. In this status, the wireless LAN terminal 5A can access, without any restriction, the network UG1 (Intranet) of the enterprise A and the Internet via the wireless LAN control device 3. It is not desirable in terms of network security of the enterprise A to allow such a status to all the users connecting to the access point 4A of the enterprise A. This being the case, access restriction is imposed on the user (the wireless LAN terminal) of the different user group.

After the IP address has been leased to the wireless LAN terminal 5A, the user transmits an IP packet containing a connecting destination (a destination IP address) and designation of the application (such as HTTP (HyperText Transfer Protocol), FTP (File Transfer Protocol) and SIP (Session Initiation Protocol)) by use of the wireless LAN terminal 5A.

The IP packet is received by the transmitting/receiving unit 21 of the wireless LAN control device 3 via the access point 4A. Then, the access control module 23D executes an access control process of the IP packet.

Figure 15:
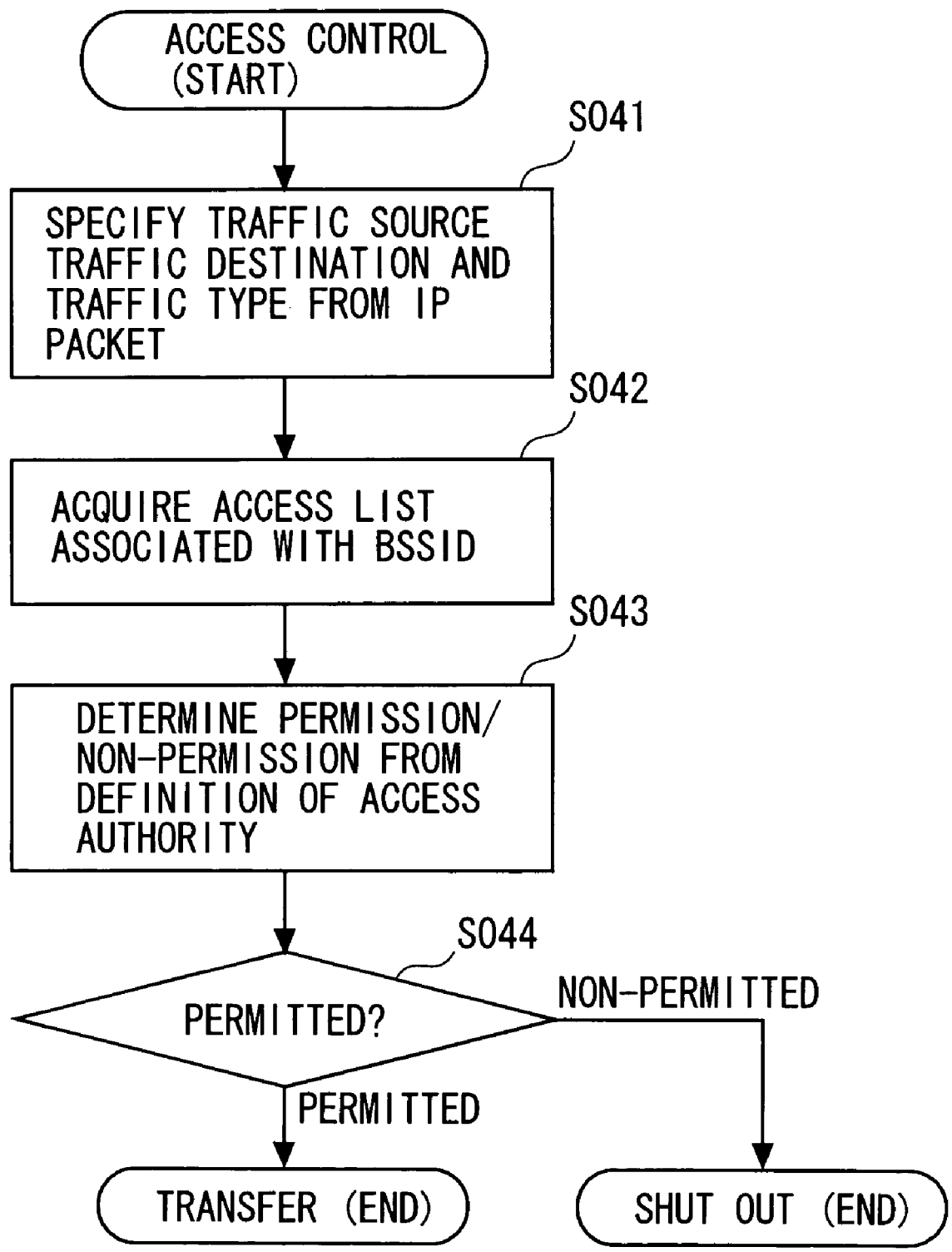
FIG. 15 is a flowchart showing an example of an access control process.

FIG. 14 is a diagram showing an example of a data structure of the access list table 256 stored on the storage unit 24. FIG. 15 is a flowchart showing the access control process.

As shown in FIG. 14, the access list table 256 is composed of a plurality of access lists 257 prepared on the user-group-by-user-group basis. The access list 257 is structured of a plurality of records each consisting elements (fields) such as a [transmission source], a [transmission destination], a [traffic type] and [access authority]. The access authority (permission/non-permission of the communication) for the IP packet communications with a designated traffic type (application for use) of the traffic to the destination from the source, is defined in each of the records. The definitions are applied in the sequence from the uppermost record to the lowermost record of the list.

In FIG. 14, a record A in the access list 257 represents that passage of all the traffics from a subnet ""10.1.x.x/24" is permitted. A record suite B represents that the passage of the traffic from the subnet "10.2.x.x/24" to a subnet "10.y.y.y/24" is not permitted, while the passage of a traffic from the subnet "10.2.x.x/24" to subnets other than the subnet "10.2.x.x/24" is permitted. A record suite C represents that the passage of a SIP/RTP traffic from the subnet "10.3.x.x/24" to the subnet "10.y.y.y/24" is permitted, the passage of the traffics excluding the SIP/RTP traffic from the subnet "10.3.x.x/24" to the subnet "10.y.y.y/24" is not permitted, and the passage of the traffics other than the traffic from the subnet "10.3.x.x/24" to the subnet "10.y.y.y/24" is permitted. A record D represents that the passage of the traffics excluding the traffics defined in the records A, B and C is not permitted.

In FIG. 15, the access control module 23D, when receiving the IP packet, specifies the transmission source, the transmission destination (destination address) and the traffic type (application for use) of the traffic of this IP packet (step S041).

Specifically, the access control module 23D extracts the source IP address and the destination IP address from an IP header of the IP packet, and extracts a port number of, e.g., a TCP (Transmission Control Protocol) header of the IP packet. The source IP address represents the user (transmission source; sender) who requests the access, the destination IP address indicates an access requestee (destination address), and the port number represents the traffic type (application for use).

Next, the access control module 23D specifies a should-refer-to access list 257 from the access list table 256 (FIG. 14) of the user group DB 25 (step S042). To be specific, the access control module 23D has received, together with the IP packet, the BSSID of the access point 4 (which is herein the access point 4A) from which to transfer the IP packet, and acquires the access list 257 associated with this BSSID. Herein, the access list 257 for the enterprise A corresponding to the access point 4 is acquired.

Next, the access control module 23D searches the access list 257 for a record coincident with (containing) the transmission source, the transmission destination and the traffic type of the traffic that have been acquired in step S041, and determines whether the passage of the IP packet is permitted or not in accordance with a content (permission/non-permission) of the access authority defined in the searched record (step S043).

Thereafter, the access control module 23D, in the case of permitting the passage of the IP packet (step S044; permission), transfers this IP packet. Whereas if the passage of the IP packet is not permitted (S044; non-permission), the access control module 23D shuts out the passage of the IP packet. With this setting, the access of the user who is not permitted to access is rejected.

Figure 16:
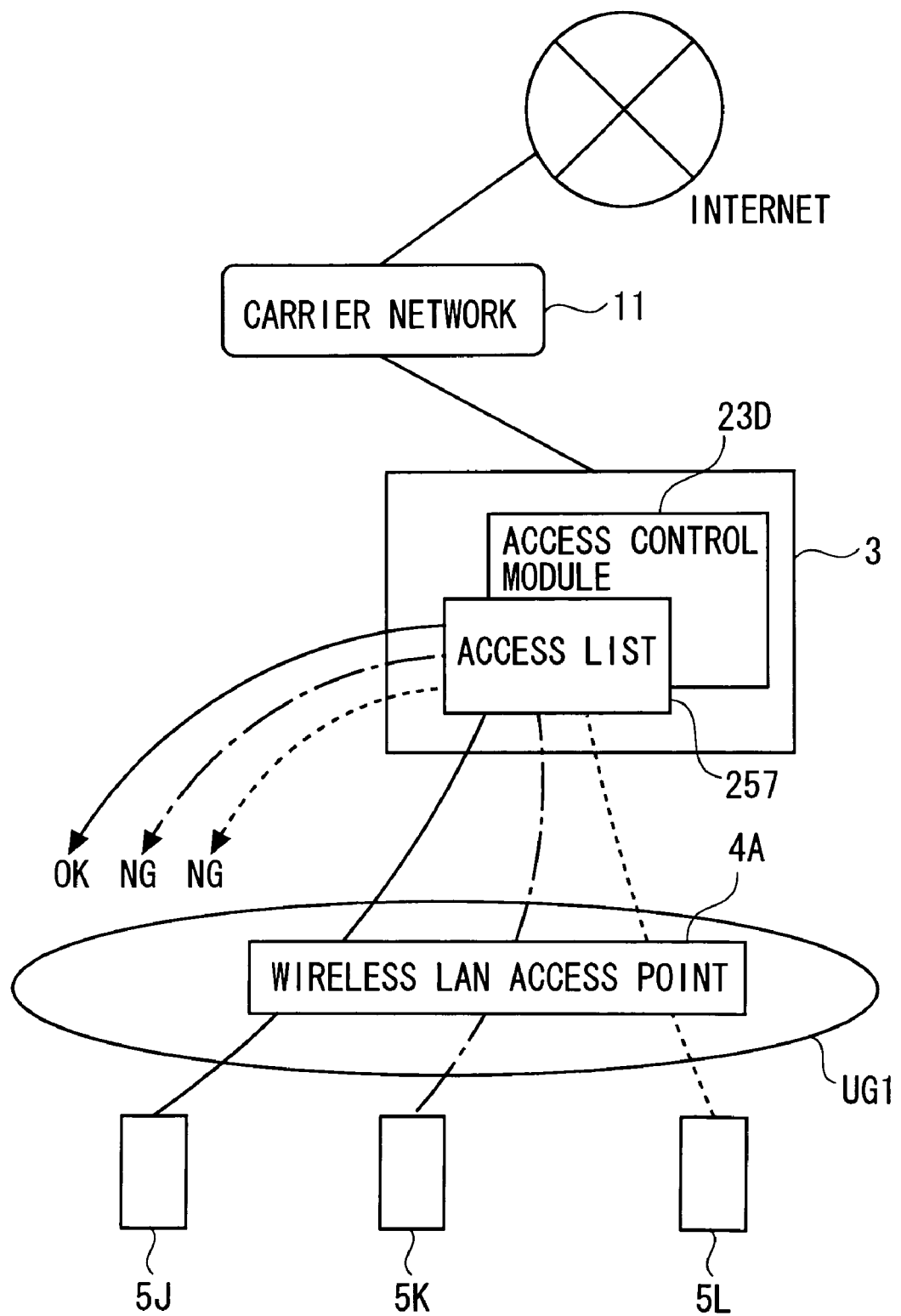
FIG. 16 is an explanatory diagram of an operation of access control.
Figure 17:
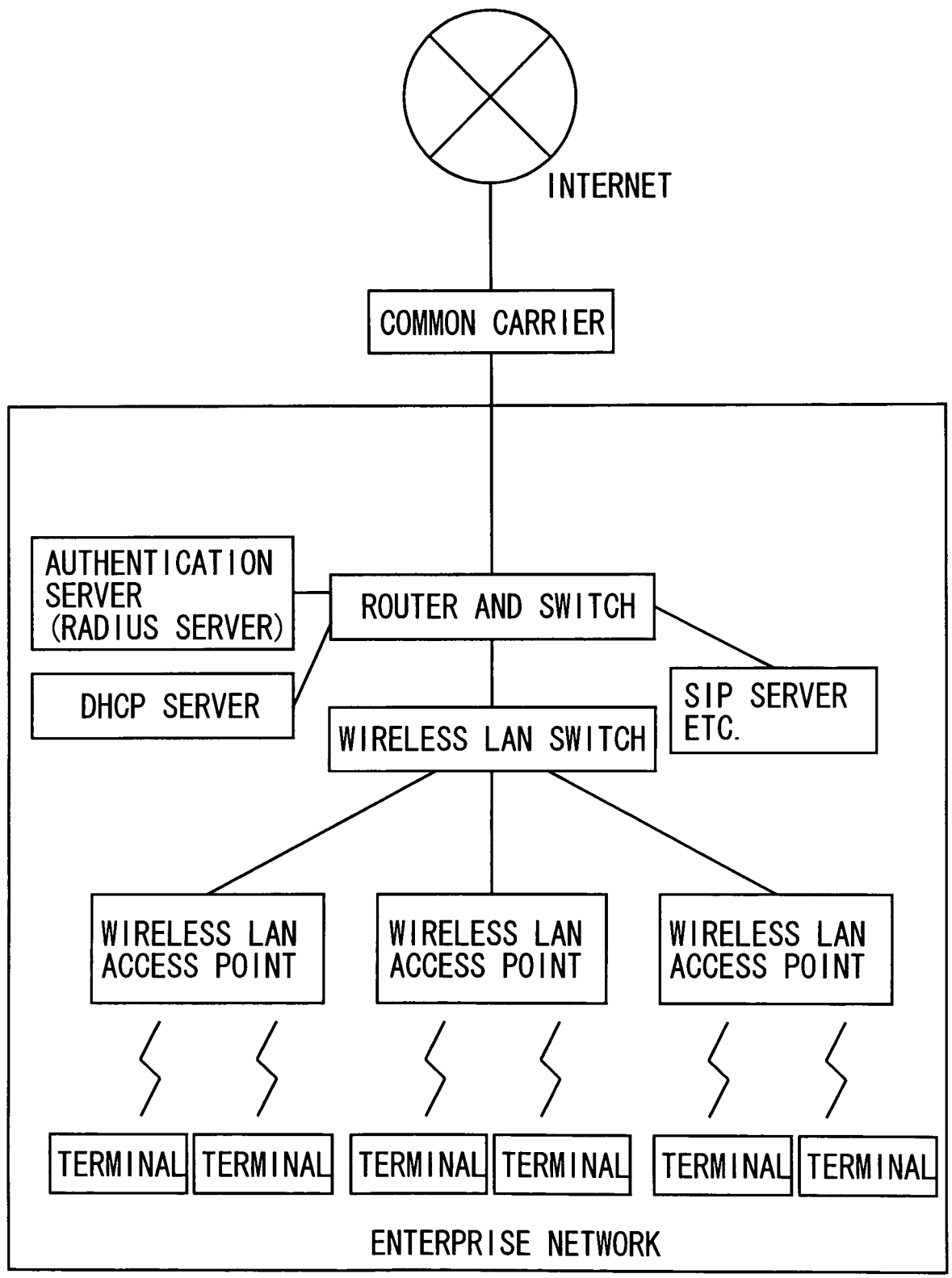
FIG. 17 is a diagram showing an architecture of a communication system to which a wireless LAN switch is applied.

FIG. 16 is an explanatory diagram of an operation of the access control. FIG. 16 shows wireless LAN terminals 5J, 5K, 5L connected to the access point 4A in the network UG1 of the enterprise A. The wireless LAN terminal 5J is a terminal of the user belonging to the enterprise A, the wireless LAN terminal 5K is a terminal of the user belonging to, e.g., the enterprise B, and the wireless LAN terminal 5L is a terminal of the user belonging to, e.g, the home. When the user authentication of each of the wireless LAN terminals 5J, 5K, 5L get successful, the IP addresses, which should be used by the respective terminals 5G, 5H, 5L are leased from the corresponding DHCP server by the DHCP relay process. At this time, the DHCP server manages, in the IP address pool, an IP address group (an address domain) corresponding to the access authority for the respective terminals, wherein one IP address corresponding to the access authority is leased to each of the terminals 5G, 5H, 5L.

Herein, for example, one IP address of the IP address group (containing a network address "10.1.1.1" belonging to, e.g., a subnet "10.1.x.x") for permitting all the services (traffics), is leased to the terminal 5J (the user of the enterprise A). Further, one IP address of the IP address group (containing a network address "10.2.1.1" belonging to, e.g., a subnet "10.2.x.x") for restricting only the access to the Intranet of the enterprise A, is leased to the terminal 5K (the user of the enterprise B). Moreover, one IP address of the IP address group (containing a network address "10.3.1.1" belonging to, e.g., a subnet "10.3.x.x") for permitting only voice communications (SIP/RTP traffic) is leased to the terminal 5L (the user of the home).

On the other hand, the following access control is defined on a subnet-by-subnet basis in the access list 257 of the wireless LAN control device 3. For instance, a statistically manual setting method of setting the definitions in the wireless LAN control device 3 and a dynamically automatic setting method of setting the definitions from an external server such as a policy server can be applied as a method of setting the definitions in the access list 257.

(1) If the source IP address belongs to the subnet "10.1.x.x", the passage of the IP packet is permitted irrespective of the destination address and the traffic type of the IP packet.

(2) If the source IP address belongs to the subnet "10.2.x.x", only the access to the IP address (e.g., the IP address of the network of the enterprise A) containing the subnet "10.y.y.y" is restricted (the IP packet is discarded).

(3) If the source IP address belongs to the subnet "10.3.x.x", the passage of the IP packet is permitted only in such a case that the traffic type is "SIP/RTP".

On the premise of the above definitions, an assumption is that each of the terminals 5G, 5H, 5L sent the IP packet addressed to the subnet "10.y.y.y". In this case, in the wireless LAN control device 3, the access control module 23D handles the respective IP packets according to the definitions in the access list 257 in the way that follows.

(A) The passage of the IP packet from the terminal 5J is permitted (the IP packet is transferred to the destination address).

(B) The IP packet from the terminal 5K is discarded.

(C) If the traffic type of the IP packet from the terminal 5L is [SIP/RTP], the passage of the IP packet is permitted, and, if being a traffic type other than [SIP/RTP], the IP packet is discarded.

According to the configuration given above, when the user of the unspecified user group utilizes the network service by utilizing the access point of the different user group, the different user group can impose the desired access restriction upon the user of the unspecified user group. In the example shown in FIG. 15, the enterprise A can restrict all the accesses of the users of the enterprise B to the network UG1 of the enterprise A. On the other hand, the enterprise A can permit only the voice communications for the user of the home by use of the network UG1 of the enterprise A.

Thus, the proper access control can be conducted about the user of each user group by leasing the IP address containing the different subnet on the user-group-by-user-group basis and setting, in the wireless LAN control device 3, the definitions of the access authority that are prepared on the subnet-by-subnet basis.

It should be noted that the example illustrated in FIG. 16 shows the method of performing the access control on the unit of the network address, however, the unit for applying the access control can be determined without any restrictions such as doing the access control on the unit of the IP address of the specified wireless LAN terminal.

<Effects of Embodiment>

On such an occasion that the carrier provides the wireless LAN service, the same device can accommodate the plurality of enterprises, the public wireless LAN and the homes in mixture. This scheme leads to a rise in a subscriber accommodation efficiency and to a decrease in costs for the equipment.

The carrier can provide new services to the user. For example, with respect to a free spot within the enterprise and the access point of the user of home, the service utilizable by other home users can be provided. New services unable to hitherto be provided can be provided, such as a service for imposing a charge on not only the user having the access point but also the user actually performing the communications.

The carrier acts as go-between and as a third party for the user authentication between the enterprises, thereby eliminating the necessity of directly transmitting and receiving the authentication information between the authentication servers of the enterprises and enabling the user authentication to be done without leveling down the security.

The enterprise utilizes the wireless LAN access point within the self-enterprise for the users in the self-enterprise, and at the same time the wireless LAN access point can be shared as a free spot among the guest users outside the enterprise, thus enabling improvement of the service for the guest users. Since the access control can be done on the user-group-by-user-group basis, it is possible to provide the Internet access to the users outside the enterprise, who utilize the wireless LAN access points installed at a reception desk and in a meeting room within the enterprise without any level-down of the security in the enterprise, and the usability is improved.

INCORPORATION BY REFERENCE

The disclosures of Japanese patent application, No. JP2005-378195 filed on Dec. 28, 2005 including the specification, drawings and abstract are incorporated by reference.

What is claimed is:

1. A wireless network control device comprising:
a communication unit performing communications with a plurality of wireless base stations belonging to different user groups;
a control unit executing control of transferring a user authentication request received by the communication unit via one of the plurality of wireless base stations and given from a wireless terminal belonging to one of the user groups toward an authentication device that should execute an authentication process in response to the user authentication request, and transmitting an authentication result given from the authentication device in response to the user authentication request to the wireless terminal via one of the plurality of wireless base stations; and
a storage unit stored with identifying information of a leasing device that leases an IP address for a user group to which the wireless terminal belongs, the leasing device being associated with a usage authority identifier specifying the usage authority of one of the plurality of wireless base stations,
wherein when the communication unit receives the IP address acquisition request from the wireless terminal succeeding in the user authentication via one of the plurality of wireless base stations, the control unit transfers the IP address acquisition request to the leasing device, and transmits the IP address received from the leasing device to the wireless terminal from the communication unit,
wherein the control unit transfers the IP address acquisition request on the basis of the identifying information of the leasing device associated with the usage authority identifier received together with the IP address acquisition request by the communication unit and given from the wireless terminal.

2. A wireless network control device according to claim 1, wherein the usage authority identifier has a value different on a user-group-by-user-group basis,
a plurality of IP address groups associated with the usage authority identifiers are prepared, and
the IP address is leased to the wireless terminal from the IP address group associated with the usage authority identifier given from the wireless terminal.

3. A wireless network control device according to claim 2, wherein the plurality of IP address groups are managed by the user group to which one of the plurality of wireless base stations belongs and contain subnets different from each other.

4. A wireless network control device according to claim 2, wherein the definition information contains information showing that the transfer of the IP packet to a predetermined destination address is not permitted.

5. A wireless network control device according to claim 2, wherein the definition information contains information showing that the transfer of the IP packet related to a predetermined application is not permitted.

6. A wireless network control device according to claim 1, wherein the control unit, when receiving the user authentication request, judges whether or not the wireless terminal has authority of using one of the plurality of wireless base stations and, if not having the authority, does not transfer the user authentication request.

7. A wireless network control device according to claim 6, further comprising a storage unit registered with a usage authority identifier specifying usage authority of one of the plurality of wireless base stations,
wherein the control unit, if the usage authority identifier received together with the user authentication request by the communication unit and given from the wireless terminal is registered in the storage unit, transfers the user authentication request but, if not, does not transfer the user authentication request.

8. A wireless network control device according to claim 7, wherein the storage unit is stored with identifying information of the authentication device to which the user authentication request associated with the usage authority identifier should be transferred, and
the control unit transfers the user authentication request on the basis of the identifying information of the authentication device.

9. A wireless network control device according to claim 7, wherein one of the plurality of wireless base stations is a wireless LAN access point,
the wireless terminal is a wireless LAN terminal, and
the usage authority identifier is an ESSID.

10. A wireless network control device according to claim 1, wherein the control unit, if the wireless terminal and one of the plurality of wireless base stations belong to a different user group, restricts a communication service utilizable to the wireless terminal by use of one of the plurality of wireless base stations.

11. A wireless network control device according to claim 10, further comprising a storage unit stored with definition information that defines a communication service utilizable to the wireless terminal associates with the IP address leased to the wireless terminal, and
when a transmitting/receiving unit receives an IP packet from the wireless terminal via the plurality of wireless base stations, the control unit judges permission/non-permission of passage of the IP packet in accordance with the definition information associated with a source IP address set in the IP packet.

12. A wireless network control device according to claim 1, wherein the control unit transfers the authentication request to the authentication device corresponding to the user group to which one of the plurality of wireless base stations belongs, and
the user authentication request is, if the authentication process can not be executed by the authentication device corresponding to the user group to which one of the plurality of wireless base stations belongs, transferred to the authentication device that should execute the authentication process in response to the authentication request via at least one relay device.

13. A wireless network control system comprising:
a wireless network control device accommodating a plurality of wireless base stations belonging to different user groups; and a plurality of authentication devices each executing an authentication process in response to a user authentication request given from a wireless terminal of a user belonging to each of the user groups, wherein the wireless network control device comprises:

a communication unit performing communications with the plurality of wireless base stations belonging to different user groups; and a control unit executing control of transferring a user authentication request received by the communication unit via one of the plurality of wireless base stations and given from a wireless terminal belonging to one of the user groups toward an authentication device that should execute an authentication process in response to the user authentication request, and transmitting an authentication result given from the authentication device in response to the user authentication request to the wireless terminal via one of the plurality of wireless base stations, a storage unit stored with identifying information of a leasing device that leases an IP address for a user group to which the wireless terminal belongs, the leasing device being associated with the usage authority identifier specifying the usage authority of one of the plurality of wireless base stations, when the communication unit receives the IP address acquisition request from the wireless terminal succeeding in the user authentication via one of the plurality of wireless base stations, the control unit transfers the IP address acquisition request to the leasing device, and transmits the IP address received from the leasing device to the wireless terminal from the communication unit, the control unit transfers the IP address acquisition request on the basis of the identifying information of the leasing device associated with the usage authority identifier received together with the IP address acquisition request by the communication unit and given from the wireless terminal, the authentication device receiving the user authentication request from the wireless network control device, if unable to execute an authentication process in response to the user authentication request in the self-device, executes a transfer process of transferring the user authentication request, and the transferred user authentication request reaches the authentication device that should execute the authentication process in response to the user authentication request via at least one of relay devices.

14. A wireless network control system according to claim 13, wherein the authentication device receiving the user authentication request from the wireless network control device, if unable to execute the authentication process in response to the user authentication request in the self-device, transfers the user authentication request to the authentication device that should execute the authentication process in response to the user authentication request sent through a direct connection established by VPN (Virtual Private Network).

15. A wireless network control system according to claim 13, wherein each of the authentication devices includes:

a storage unit registered with user information of a user executing the authentication process in the self-device and with transfer destination information showing a transfer destination of the user authentication request given from the user who is not contained in the user information; and a control unit executing, when receiving the user authentication request and if the storage unit is registered with the user information corresponding to the user authentication request, the authentication process in response to the user authentication request and, if not, transferring the user authentication request in accordance with the transfer destination information.

* * * * *